United States Patent
Tomono et al.

(10) Patent No.: US 10,872,234 B2
(45) Date of Patent: Dec. 22, 2020

(54) INFORMATION PROCESSING APPARATUS, INFORMATION PROCESSING METHOD, AND INFORMATION PROCESSING SYSTEM

(71) Applicant: FUJITSU LIMITED, Kawasaki (JP)

(72) Inventors: Mitsuru Tomono, Higashimurayama (JP); Ryosuke Yamanaka, Kawasaki (JP); Satoshi Tanabe, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 222 days.

(21) Appl. No.: 16/021,848

(22) Filed: Jun. 28, 2018

(65) Prior Publication Data

US 2019/0012530 A1    Jan. 10, 2019

(30) Foreign Application Priority Data

Jul. 5, 2017  (JP) .................. 2017-132169

(51) Int. Cl.
*G06K 9/00* (2006.01)
*G06T 7/246* (2017.01)
(Continued)

(52) U.S. Cl.
CPC ......... *G06K 9/00342* (2013.01); *G06K 9/623* (2013.01); *G06T 7/248* (2017.01);
(Continued)

(58) Field of Classification Search
CPC .... G06K 9/00342; G06K 9/623; G06T 7/277; G06T 7/251; G06T 7/248; G06T 2207/30196
See application file for complete search history.

(56) References Cited

U.S. PATENT DOCUMENTS

2005/0286738 A1* 12/2005 Sigal .................. G06K 9/32
                                                        382/103
2007/0104351 A1    5/2007 Yang et al.
(Continued)

FOREIGN PATENT DOCUMENTS

JP    2009-514111    4/2009
JP    2012-141881    7/2012
(Continued)

OTHER PUBLICATIONS

Xianjie Chen et al., "Articulated Pose Estimation by a Graphical Model with Image Dependent Pairwise Relations", Advances in Neural Information Processing Systems, pp. 1736-1744, 2014 (9 pages).

(Continued)

*Primary Examiner* — Marcus Hammonds
(74) *Attorney, Agent, or Firm* — Fujitsu Patent Center

(57) ABSTRACT

A non-transitory computer-readable recording medium having stored therein an information processing program for causing a computer to execute a process includes: calculating, by using an image including an object having a plurality of joints and having a plurality of frames consecutive in time, a probability distribution of a joint position of the object in each frame; calculating a transition score by evaluating a consistency of a transition of a joint of the plurality of joints using transition information of the joint among different frames; and estimating a pose of the object from a score of the probability distribution and the transition score.

9 Claims, 20 Drawing Sheets

INPUT IMAGE

JOINT POSITION PROBABILITY DISTRIBUTION

ESTIMATION RESULT

(51) Int. Cl.
  *G06K 9/62* (2006.01)
  *G06T 7/277* (2017.01)
(52) U.S. Cl.
  CPC .............. *G06T 7/251* (2017.01); *G06T 7/277* (2017.01); *G06T 2207/30196* (2013.01)

(56) References Cited

U.S. PATENT DOCUMENTS

| | | | | |
|---|---|---|---|---|
| 2012/0269393 | A1* | 10/2012 | Komoto | G06T 13/40 |
| | | | | 382/103 |
| 2013/0271458 | A1* | 10/2013 | Andriluka | G06K 9/00342 |
| | | | | 345/420 |
| 2014/0219550 | A1* | 8/2014 | Popa | G06K 9/00342 |
| | | | | 382/154 |
| 2015/0036879 | A1* | 2/2015 | Shiozaki | G06K 9/00369 |
| | | | | 382/103 |
| 2015/0194070 | A1 | 7/2015 | Sakai et al. | |
| 2018/0024641 | A1* | 1/2018 | Mao | G06T 7/251 |
| | | | | 382/103 |
| 2019/0266734 | A1* | 8/2019 | Yamanaka | G06T 7/90 |

FOREIGN PATENT DOCUMENTS

| | | |
|---|---|---|
| JP | 2015-128507 | 7/2015 |
| JP | 2016-112053 | 6/2016 |

OTHER PUBLICATIONS

Wei Yang et al., "End-to-End Learning of Deformable Mixture of Parts and Deep Convolutional Neural Networks for Human Pose Estimation", Computer Vision and Pattern Recognition(CVPR), pp. 3073-3082, 2016 (10 pages).

* cited by examiner

FIG. 3
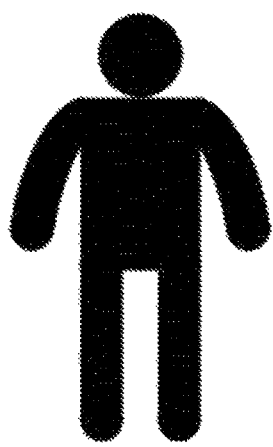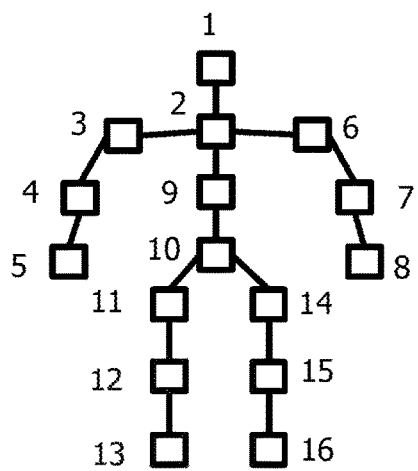
| JOINT NUMBER | JOINT NAME |
|---|---|
| 1 | Head |
| 2 | Neck |
| 3 | ShoulderRight |
| 4 | ElbowRight |
| 5 | HandRight |
| 6 | ShoulderLeft |
| 7 | ElbowLeft |
| 8 | HandLeft |
| 9 | SpineMid |
| 10 | Spinebase |
| 11 | HipRight |
| 12 | KneeRight |
| 13 | Foot Right |
| 14 | HipLeft |
| 15 | KneeLeft |
| 16 | FootLeft |

FIG. 11
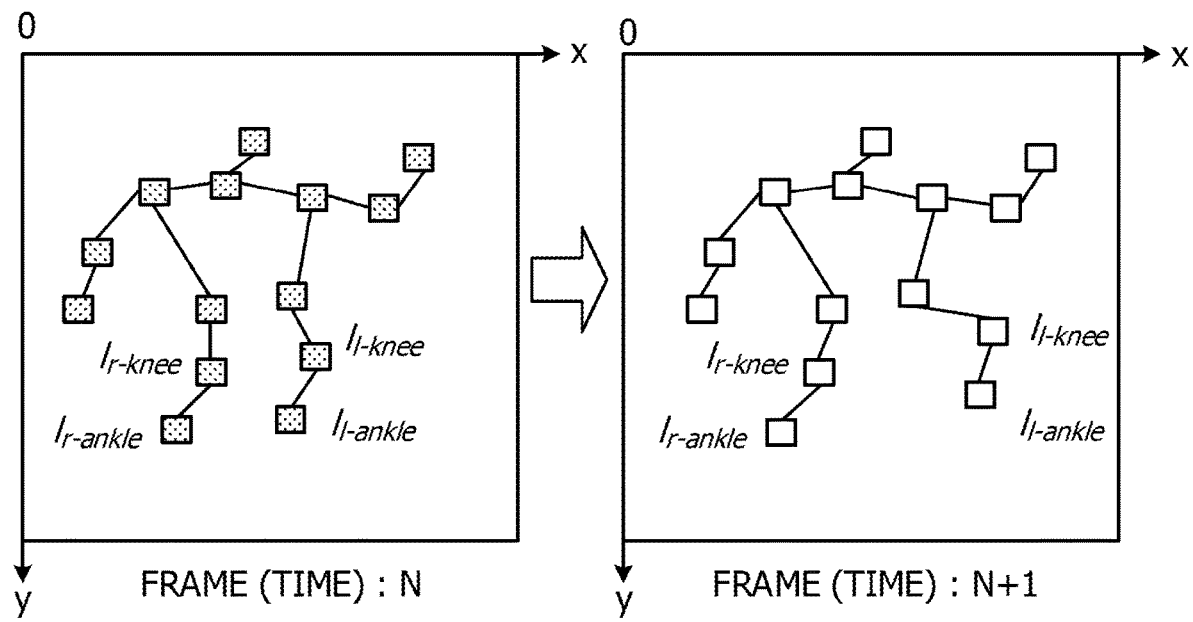
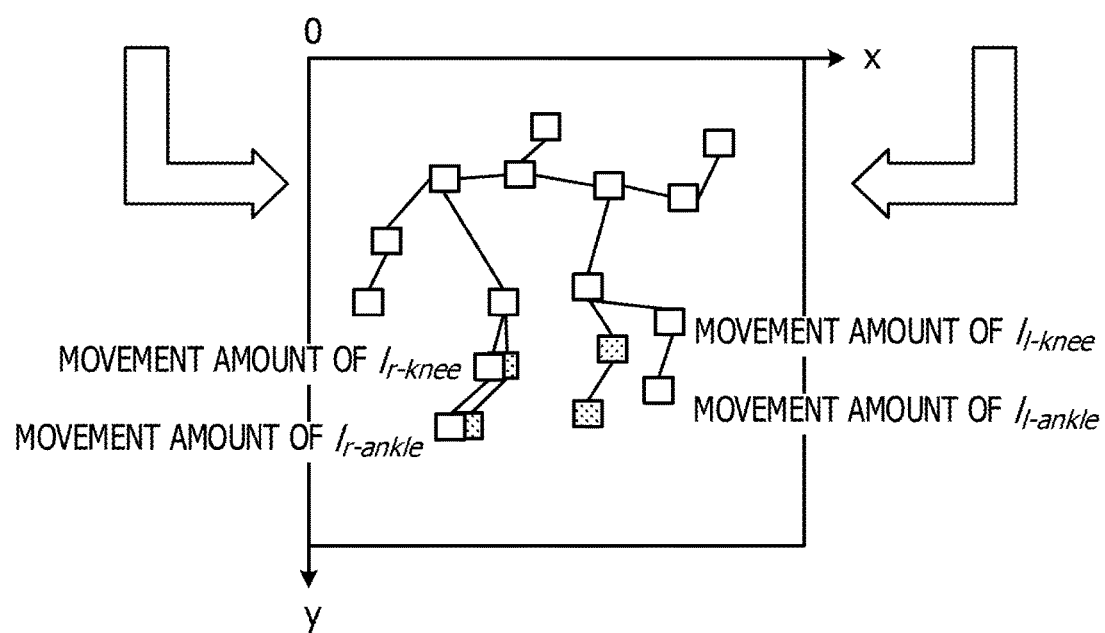

| JOINT NO. | JOINT NAME | COORDINATE (x,y) | TYPE |
|---|---|---|---|
| 1 | Head | 100,200 | 0 |
| 2 | Neck | 100,40 | 6 |
| 3 | ShoulderRight | 70,43 | 4 |
| 4 | ElbowRight | 50,60 | 3 |
| 5 | HandRight | 45,70 | 7 |
| 6 | ShoulderLeft | 130,43 | 2 |
| 7 | ElbowLeft | 150,60 | 3 |
| 8 | HandLeft | 155,70 | 0 |
| 9 | SpineMid | 100,60 | 3 |
| 10 | Spinebase | 100,70 | 5 |
| 11 | HipRight | 80,90 | 1 |
| 12 | KneeRight | 80,110 | 7 |
| 13 | Foot Right | 80,130 | 3 |
| 14 | HipLeft | 120,90 | 4 |
| 15 | KneeLeft | 120,110 | 2 |
| 16 | FootLeft | 120,130 | 1 |

| JOINT NO. | JOINT NAME | COORDINATE (x,y,z) | TYPE |
|---|---|---|---|
| 1 | Head | 100,200,3000 | 0 |
| 2 | Neck | 100,40,3010 | 6 |
| 3 | ShoulderRight | 70,43,3020 | 4 |
| 4 | ElbowRight | 50,60,3030 | 3 |
| 5 | HandRight | 45,70,3040 | 7 |
| 6 | ShoulderLeft | 130,43,3000 | 2 |
| 7 | ElbowLeft | 150,60,3015 | 3 |
| 8 | HandLeft | 155,70,3020 | 0 |
| 9 | SpineMid | 100,60,3018 | 3 |
| 10 | Spinebase | 100,70,3019 | 5 |
| 11 | HipRight | 80,90,3021 | 1 |
| 12 | KneeRight | 80,110,3030 | 7 |
| 13 | Foot Right | 80,130,3015 | 3 |
| 14 | HipLeft | 120,90,3010 | 4 |
| 15 | KneeLeft | 120,110,3009 | 2 |
| 16 | FootLeft | 120,130,3031 | 1 |

INFORMATION PROCESSING APPARATUS, INFORMATION PROCESSING METHOD, AND INFORMATION PROCESSING SYSTEM

CROSS-REFERENCE TO RELATED APPLICATION

This application is based upon and claims the benefit of priority of the prior Japanese Patent Application 2017-132169, filed on Jul. 5, 2017, the entire contents of which are incorporated herein by reference.

FIELD

The embodiments discussed herein are related to an information processing program, an information processing apparatus, an information processing method, and an information processing system.

BACKGROUND

In the field of the computer vision, the estimation of a pose (posture) of a person in an image has been studied for a long time. As a representative method, there is a pose estimation using a human body model in which joints and parts of the human body are expressed in a graphical model.

Related art is discussed in Non-Patent Document 1: X. Chen and A. Yuille: "Articulated Pose Estimation by a Graphical Model with Image Dependent Pairwise Relations", Advances in Neural Information Processing Systems, pp. 1736-1744 (2014), or Non-Patent Document 2: W. Yang, W. Ouyang, H. Li, X. Wang: "End-to-End Learning of Deformable Mixture of Parts and Deep Convolutional Neural Networks for Human Pose Estimation", Computer Vision and Pattern Recognition (CVPR), pp. 3073-3082, (2016).

SUMMARY

A non-transitory computer-readable recording medium having stored therein an information processing program for causing a computer to execute a process includes: calculating, by using an image including an object having a plurality of joints and having a plurality of frames consecutive in time, a probability distribution of a joint position of the object in each frame; calculating a transition score by evaluating a consistency of a transition of a joint of the plurality of joints using transition information of the joint among different frames; and estimating a pose of the object from a score of the probability distribution and the transition score.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of a human body model;

FIG. 11 is a view illustrating an example of a type transition and a movement amount of a joint;

DESCRIPTION OF EMBODIMENTS

Figure 1:
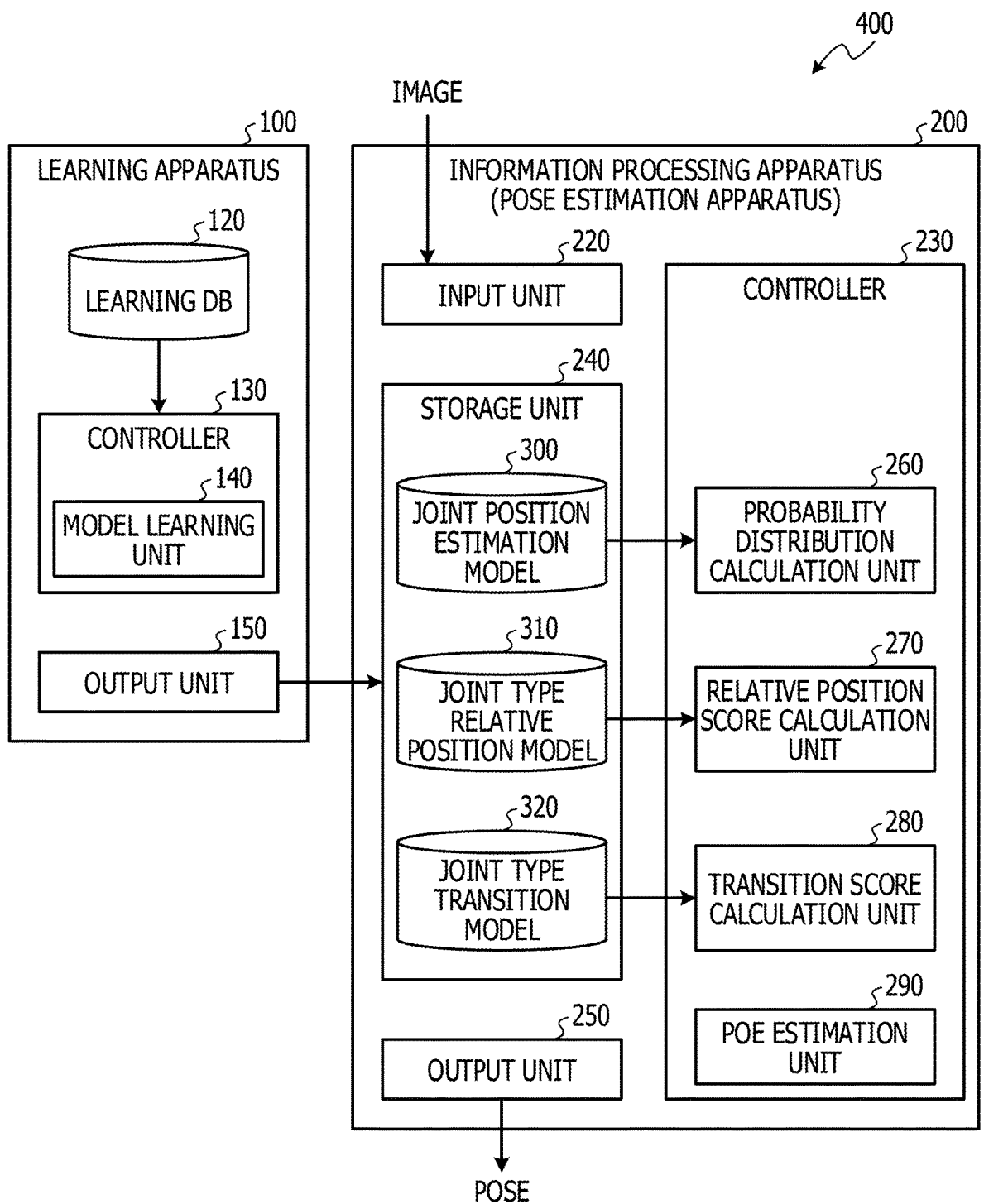
FIG. 1 is a diagram illustrating an example of a configuration of an information processing system including an information processing apparatus.

For example, there has been suggested a method of performing the pose estimation by estimating joints and parts and learning a positional relationship thereof through a deep learning.

Since the method described in Non-Patent Documents 1 and 2 above relates to a method of performing a recognition process within one frame which is one still image, the estimation precision of the pose is limited to the information within the frame. Thus, when a frame is related to preceding and succeeding frames as in, for example, a moving image, the correlated information cannot be used, and as a result, the estimation precision of the pose in each frame of the moving image may become low.

In one aspect, an information processing program, an information processing apparatus, an information processing method, and an information processing system which improve an estimation precision of a pose of an object by using correlated information of preceding and succeeding frames may be provided.

The information processing program of the present disclosure estimates the position of a joint with a high precision, in an image such as a moving image where preceding and succeeding frames are related to each other, by evaluating the consistency of transitions among different frames in the same joint of an object having a plurality of joints. Thus, it is possible to provide an information processing program which improves the estimation precision of the pose of the object.

For example, the information processing program performs the pose estimation by estimating the position of a joint of an object.

For example, first, by using an image including an object having a plurality of joints and having a plurality of consecutive frames in time, the information processing program calculates a probability distribution of a joint position of the object in each frame. Here, the object having the plurality of joints is not specifically limited as long as the object is a moving object having a joint and a part coupled to the joint, and may be, for example, a living object such as a human body or an animal or an industrial product such as a robot or a crane vehicle. A joint is a connection part that couples two or more parts with each other. The movement of a joint enables a relative movement of a part. According to the difference in the movement of a joint, types of a joint include, for example, a rotating joint which rotates about a specific axis, a linear motion joint which slides such that only a position thereof changes in one direction, and a ball joint having a spherical contact surface such as the hip joint or the shoulder joint of the human body. Examples of a joint include a joint of the human body, a joint of an animal, and a joint of a robot. Further, a joint includes a connection part in an industrial product such as a crane vehicle. A part connected to a joint is an element of an object which enables a relative movement and may be, for example, a body part such as a bone or a biological part such as a bone or a skeleton. The skeleton may be either endoskeleton or exoskeleton, and the part connected to a joint may include the exoskeleton of, for example, an arthropod or an insect. In addition, the skeleton may be a machine part in an industrial product. A frame indicates a moving image or a single shot (still image) of an image obtained by continuous shooting. The calculating the probability distribution of the joint position (hereinafter, also referred to as a "joint position probability distribution") indicates evaluating a precision of a joint in an input image from the joint and image information of the joint by using a joint position probability distribution function obtained in advance through a learning. Here, the probability distribution of the joint position indicates, for example, a value (a score (e.g., a probability)) of the precision of the existence position indicating where a joint to be recognized exists in the image.

Next, the information processing program calculates a transition score by evaluating a consistency of a transition of a joint by using transition information of the same joint of the object among different frames. The transition information is represented by a movement amount of the same joint shifting from a position in a frame before the transition to a position in a frame after the transition, and a function expressed by a weight value obtained in advance through a learning for each transition of a joint, and corresponds to a joint transition score function to be described later. The evaluation of the consistency of the transition of the joint indicates an evaluation of the precision of the transition of the same joint from the position in the frame before the transition to the position in the frame after the transition in the input image by using the joint transition score function. The evaluation indicates, for example, obtaining a transition score described hereinafter. The transition score indicates a value (score) obtained for the precision of a joint position in each frame from the consistency of the transition of joint at the same joint among the different frames. The transition score may be obtained by, for example, the inner product of the movement amount of the same joint and the weight value in the joint transition score function.

The information processing program may estimate a more detailed joint position by using a joint type including a joint and a part coupled to the joint, when evaluating the consistency of the transition of the same joint. For example, in consideration of the same joint, the information processing program evaluates the consistency of the transition of the same joint based on the movement amount in a case of a transition from a position and a joint type of the joint in the frame before the transition to a position and a joint type of the joint in the frame after the transition. Thus, the information processing program may estimate the joint position in more detail so that the estimation precision of the pose of the object may be improved. The joint type (also referred to as a "type") indicates an appearance pattern of a connection between a joint and a part coupled to the joint, and a plurality of patterns (types) are preset according to the differences in position or direction of a joint and a part. A predetermined number of joint types are set for each joint. In addition, when the consistency of the transition of the joint is evaluated by using a joint type, the above-described joint transition score function may be described as a "joint type transition score function."

Next, the information processing program estimates the pose of the object having the plurality of joints from the score of the joint position probability distribution (hereinafter, also referred to as the "score of the probability distribution") and the transition score. Based on the score of the probability distribution and the transition score, the information processing program may estimate a probable position of the joint in consideration of the position of the joint in the frame and the consistency of the transition of the joint among the frames. Specifically, the information processing program performs the pose estimation by using a total score function obtained from the joint position probability distribution function and the joint transition score function.

The information processing program searches for the maximum value of the total score function from a solution candidate of the score of the probability distribution obtained from the joint position probability distribution function and a solution candidate of the transition score obtained from the joint transition score function. That is, the information processing program may estimate the most probable position of each joint by searching for (x, y) of each joint that maximizes the total score function. Here, "x" indicates an x coordinate, and "y" indicates a y coordinate. Thus, the information processing program is able to perform the pose estimation of the object with the high precision.

Further, the information processing program calculates a relative position score by evaluating the consistency of a relative position relationship among the joints of the object in each frame. The evaluation of the consistency of the relative position relationship among the joints indicates an evaluation of the precision of the relative position among the joints in the input image from the relative position relationship among the joints by using a joint relative position score function obtained in advance through a learning. The evaluating indicates, for example, calculating the relative position score described hereinafter. The relative position score indicates a value (score) obtained for the precision of a position of a joint in a frame from the consistency of the relative position among joints in the frame.

The information processing program may estimate a more detailed joint position by using a joint type when evaluating the consistency of the relative position relationship. For example, the information processing program compares a joint type including a first joint including a joint and a part coupled to the joint with a joint type including a second joint of an adjacent joint adjacent to the joint and a part coupled to the adjacent joint, in the same frame. As a result, the information processing program may evaluate the consistency of the positions of a joint and an adjacent joint of the joint in more detail so that the estimation of a more detailed joint position is possible. The relative position score obtained as described above is used for the pose estimation, together with the score of the probability distribution and the transition score.

By integrating the score of the probability distribution, the relative position score, and the transition score with each other, the information processing program may estimate the most probable position of the joint in consideration of the position of the joint in the frame, the consistency of the relative position among joints in the frame, and the consistency of the joint transition among the frames. For example, the information processing program performs the pose estimation by using the total score function obtained from the joint position probability distribution function, the joint relative position score function, and the joint transition score function. The information processing program uses a solution candidate of the score of the probability distribution obtained from the joint position probability distribution function, a solution candidate of the relative position score obtained from the joint relative position score function, and a solution candidate of the transition score obtained from the joint transition score function. The information processing program searches for the maximum value of the total score function by using the solution candidates. For example, the information processing program may estimate the most probable position of each joint by searching for (x, y) of each joint that maximizes the total score function. As a result, the information processing program is able to perform the pose estimation of the object with the high precision.

A desirable aspect of the information processing program may include, for example, an aspect in which the information processing program performs the pose estimation by using the total score function obtained from the joint position probability distribution function, the joint relative position score function, and the joint type transition score function which are represented by using a joint type. The information processing program may estimate the most probable position of the joint by searching for searching (x, y, t) that maximizes the total score function. Here, "x" indicates an x coordinate, "y" indicates a y coordinate, and "t" indicates type: a joint type.

As another desirable aspect of the information processing program may include, for example, an aspect in which the information processing program performs the pose estimation of the object by using the score of the probability distribution, the relative position score, and the transition score as described above.

Figure 4:
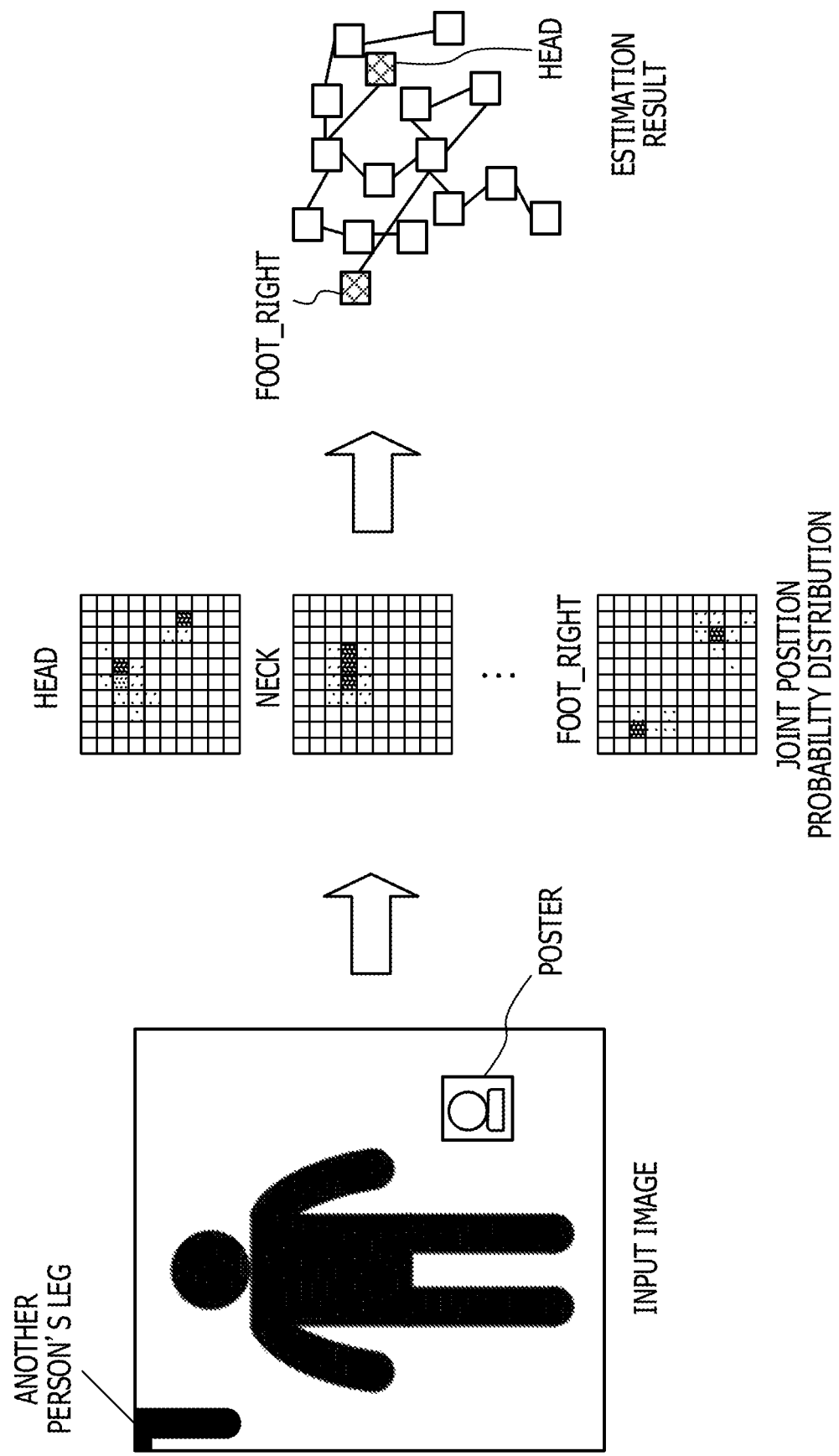
FIG. 4 is a view illustrating an example of a method of estimating a joint position according to a related art.

When the pose estimation of the object is performed by using only the score of the probability distribution, the following problem occurs in estimating the pose of the human body as illustrated in, for example, FIG. 4. In the evaluation using only the score of the probability distribution, the restriction of the connection of the human body is ignored. Thus, in a case where another human body is photographed in the background of an input image, the probability of the portion of the another human body increases, and as a result, the estimation result may be deteriorated.

Figure 5:
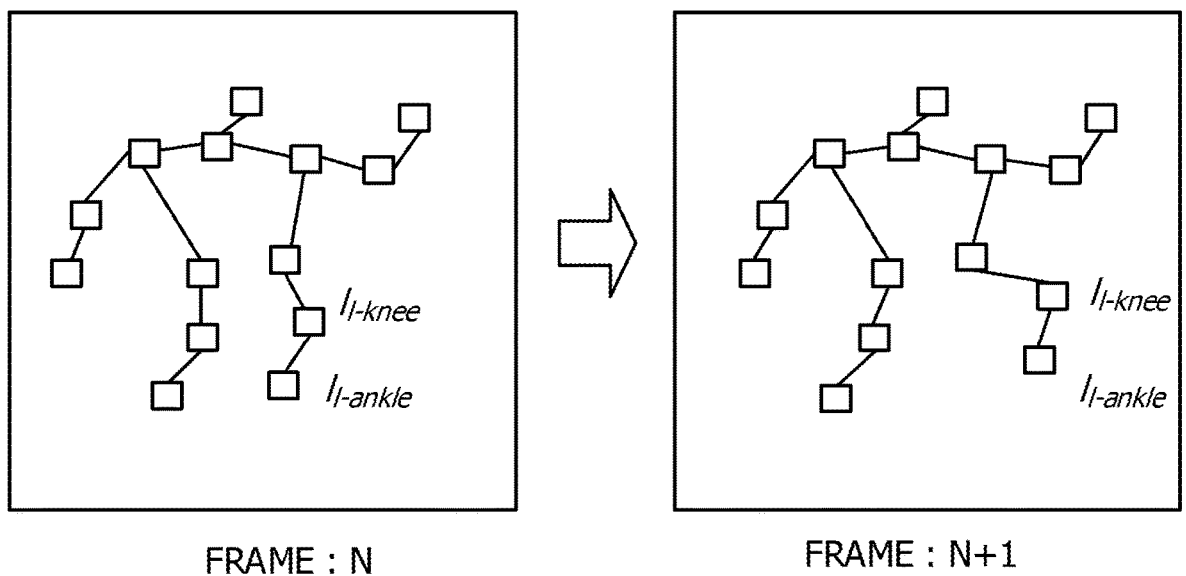
FIG. 5 is a view illustrating an example for explaining a transition of a joint in different frames.

In addition, when the pose estimation of the object is performed by using the score of the probability distribution and the relative position score, this method recognizes only the consistency of the joint position within one frame which is one still image, and as a result, the estimation precision of the pose is limited to the information in the frame. Thus, in a case where a frame is related to preceding and succeeding frames as in, for example, a moving image (e.g., the images of frames N and N+1 illustrated FIG. 5), the correlated information cannot be used, and as a result, the estimation precision of the pose in each frame of the moving image becomes low.

Since the information processing program of the present disclosure also evaluates the consistency of the joint position among the different frames by using the transition score, the information processing program may perform the estimation of the joint position in consideration of the relationship with preceding and succeeding frames as well. Thus, the information processing program is able to improve the estimation precision of the pose of the object. The processes performed by the information processing program are executed by using a computer having a controller constituting the information processing apparatus.

EMBODIMENTS

First Embodiment

Hereinafter, embodiments of the present disclosure will be described. However, the present disclosure is not limited to the embodiments. In the descriptions hereinafter, the human body will be used as an object. In addition, as a desirable aspect, the descriptions will be made by referring to an example where the pose is estimated using the score of the probability distribution, the relative position score, and the transition score, and an example where the pose is estimated using the joint type.

(Information Processing System)

FIG. 1 is a diagram illustrating a configuration of an information processing system 400 including an information processing apparatus 200 according to an embodiment of the present disclosure. Since the information processing system 400 may perform the estimation of a joint position in consideration of, for example, the relationship with preceding and succeeding frames as well, the information processing system 400 is able to estimate the pose of the human body having the plurality of joints with the high precision. The information processing system 400 includes a learning apparatus 100 and an information processing apparatus (hereinafter, also referred to as a "pose estimation apparatus") 200.

The information processing apparatus 200 is an apparatus that estimates a pose of an object having a plurality of joints with the high precision.

The information processing apparatus 200 includes an input unit 220, a controller 230, a storage unit 240, and an output unit 250.

The controller 230 is implemented by executing an information processing program by processors (a CPU 201 and a GPU 202 in FIG. 2) of the information processing apparatus 200.

The learning apparatus 100 is an apparatus that generates a joint type transition model 320 to be used in the information processing apparatus 200, through a learning, when the pose estimation is performed by executing the information processing program. In addition, the learning apparatus 100 may generate a joint position estimation model 300 or a joint type relative position model 310 to be used in the information processing apparatus 200. The learning apparatus 100 includes a learning database (learning DB) 120, a controller 130 having a model learning unit 140, and an output unit 150.

Next, the information processing apparatus 200 will be described in detail.

<Information Processing Apparatus>

The information processing apparatus 200 estimates the pose of the human body by performing the estimation of a joint position not only within the same frame but also in consideration of the relationship with preceding and succeeding frames. A hardware configuration and a functional configuration of the information processing apparatus 200 will be described.

«Hardware Configuration of Information Processing Apparatus»

Figure 2:
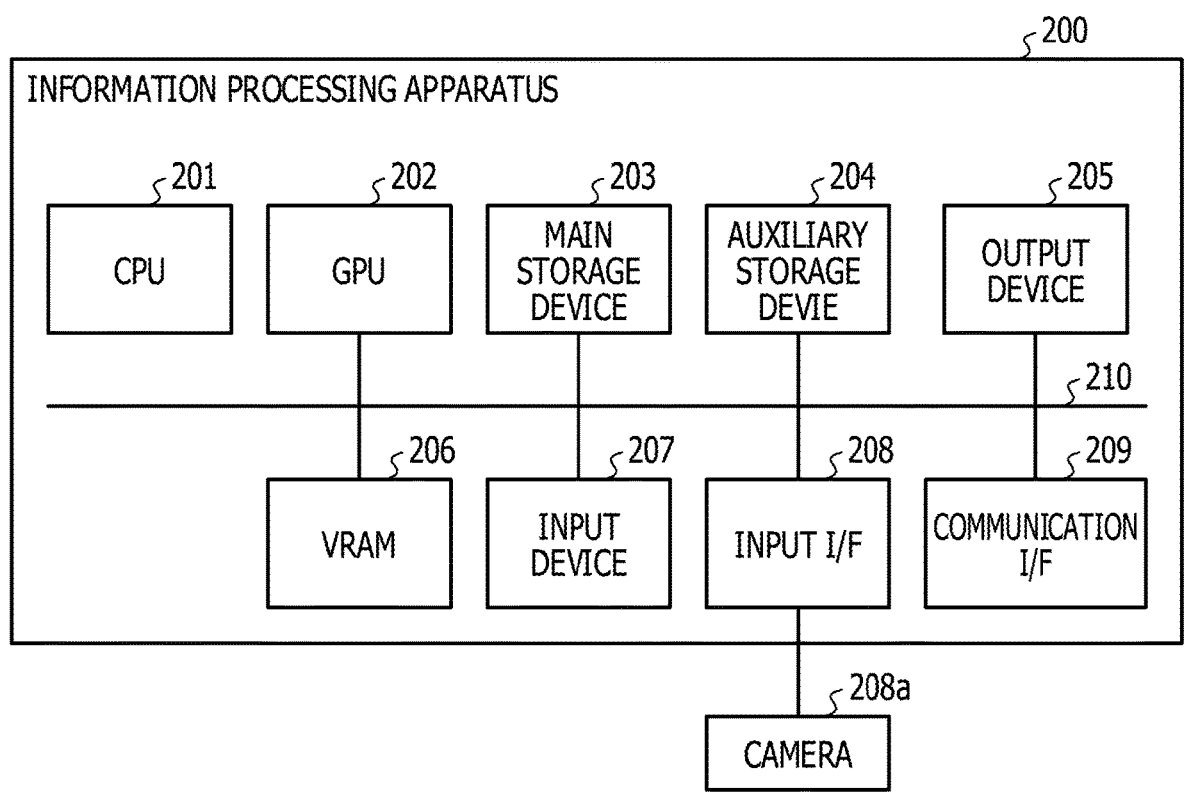
FIG. 2 is a block diagram illustrating an example of a hardware configuration of the information processing apparatus.

FIG. 2 is a block diagram illustrating an example of a hardware configuration of the information processing apparatus 200. As illustrated in FIG. 2, the information processing apparatus 200 includes the units to be described hereinafter. The units are coupled to each other through a bus 210. The CPU (central processing unit) 201 is a processor that performs various controls or arithmetic operations. The CPU 201 implements various functions by executing an OS (operating system) or programs stored in, for example, a main storage device 203. For example, in the present embodiment, the CPU 201 functions as the controller 230 of the information processing apparatus by executing the information processing program. In the present embodiment, a GPU (graphics processing unit) 202 is provided for performing an image processing. Further, the CPU 201 controls the overall operation of the information processing apparatus 200. In the present embodiment, the CPU 201 corresponds to the device controlling the overall operation of the information processing apparatus 200. However, the present disclosure is not limited thereto, and for example, a FPGA (field programmable gate array) or the like may be used.

The information processing program or various models may not be necessarily stored in, for example, the main storage device 203 or an auxiliary storage device 204. The information processing program or various models may be stored in, for example, another information processing apparatus coupled to the information processing apparatus 200 via the Internet, a LAN (local area network), a WAN (wide area network) or the like. The information processing apparatus 200 may acquire and execute the information processing program or various models from the another information processing apparatus. The main storage device 203 stores various programs and stores, for example, data necessary for executing the various programs. The main storage device 203 includes a ROM (reed only memory) and a RAM (random access memory) (not illustrated). The ROM stores, for example, various programs such as a basic input/output system (BIOS). The RAM functions as a work range where the various programs stored in the ROM are developed when being executed by the CPU 201. The RAM is not specifically limited and may be appropriately selected according to a purpose. The RAM may be, for example, a DRAM (dynamic random access memory), an SRAM (static random access memory) or the like. The auxiliary storage device 204 is not specifically limited as long as the auxiliary storage device 204 is capable of storing various types of information, and may be appropriately selected according to a purpose. For example, the auxiliary storage device 204 may be a solid state drive, a hard disk drive or the like. In addition, the auxiliary storage device 204 may be a portable storage device such as a CD (compact disc) drive, a DVD (digital versatile disc) drive, or a BD (Blu-ray (registered trademark) disc) drive.

As for an output device 205, for example, a display or a speaker may be used. The display is not specifically limited and may be appropriately selected from known displays. For example, a liquid crystal display or an organic EL display may be used. A video random access memory (VRAM) 206 is a memory area for holding data to display an image on a display such as a monitor. An input device 207 is not specifically limited as long as the input device 207 is capable of receiving various requests to the information processing apparatus 200, and may be appropriately selected from known input devices. For example, a keyboard, a mouse, a touch panel or the like may be used. An input interface (input I/F) 208 performs transmission/reception of data with an external device coupled to the input I/F 208. In the present embodiment, a camera 208a is coupled as an external device to the input I/F 208, and the input I/F 208 transmits image data transmitted from the camera 208a to the processor. A communication interface (communication I/F) 209 is not specifically limited and may be appropriately selected from known communication I/F. For example, a wireless communication device, a wired communication device or the like may be used. With the hardware configuration described above, the processing function of the information processing apparatus 200 may be implemented.

<<Functional Configuration of Information Processing Apparatus>>

Referring back to FIG. 1, the information processing apparatus 200 includes the controller 230 and the storage unit 240. The controller 230 controls the entire information processing apparatus 200. The controller 230 includes a probability distribution calculation unit 260, a relative position score calculation unit 270, a transition score calculation unit 280, and a pose estimation unit 290. The controller 230 performs the estimation of a pose of an object having a plurality of joints with respect to an image including the object, by using various models stored in the storage unit 240. The storage unit 240 has the joint position estimation model 300, the joint type relative position model 310, and the joint type transition model 320.

<<<Probability Distribution Calculation Unit>>>

By using the joint position estimation model 300, the probability distribution calculation unit 260 recognizes a joint portion in an image, and calculates a score (a probability distribution in the present embodiment) indicating the precision of an existence position indicating where the joint corresponding to a recognized target exists in the image. Further, in the present embodiment, the probability distribution is calculated. However, the present disclosure is not limited thereto, and a value indicating the precision may be calculated. The calculated probability distribution may be provided for the process of the pose estimation unit 290. The joint position estimation model 300 is expressed by the joint position probability distribution function (q) ( ) described above. The joint position estimation model 300 may be acquired through a learning in the learning apparatus 100 to be described later. In addition, the acquisition of the joint position estimation model 300 is not limited thereto, and for example, a model prepared in advance by another learning apparatus may be used.

Figure 7:
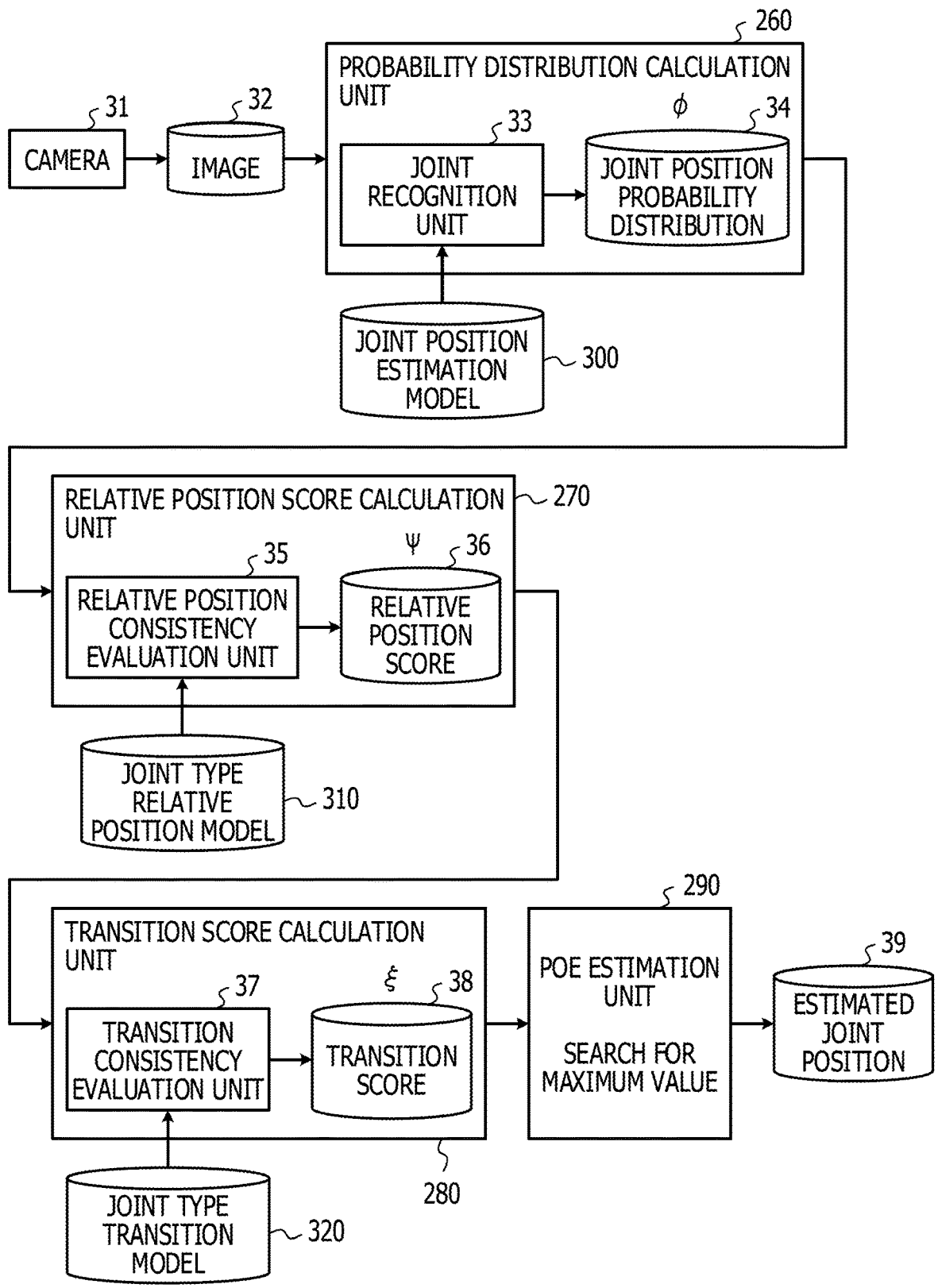
FIG. 7 is a view illustrating an example of a procedure for a pose estimation.

The procedure for calculating the joint position probability distribution in the probability distribution calculation unit 260 will be described with reference to FIG. 7. Further, descriptions will be made with reference to a flowchart illustrating an example of the estimation of the pose of the human body in FIGS. 19A and 19B as well. The probability distribution calculation unit 260 includes a joint recognition unit 33. The joint recognition unit 33 recognizes each joint portion in an image 32 input from a camera 31, by using the joint position estimation model 300 (step S120). Then, the probability distribution calculation unit 260 expresses the precision of the existence position indicating where the recognized joint exists in the image, as a joint position probability distribution (φ) 34 (steps S140 and S150).

Figure 6:
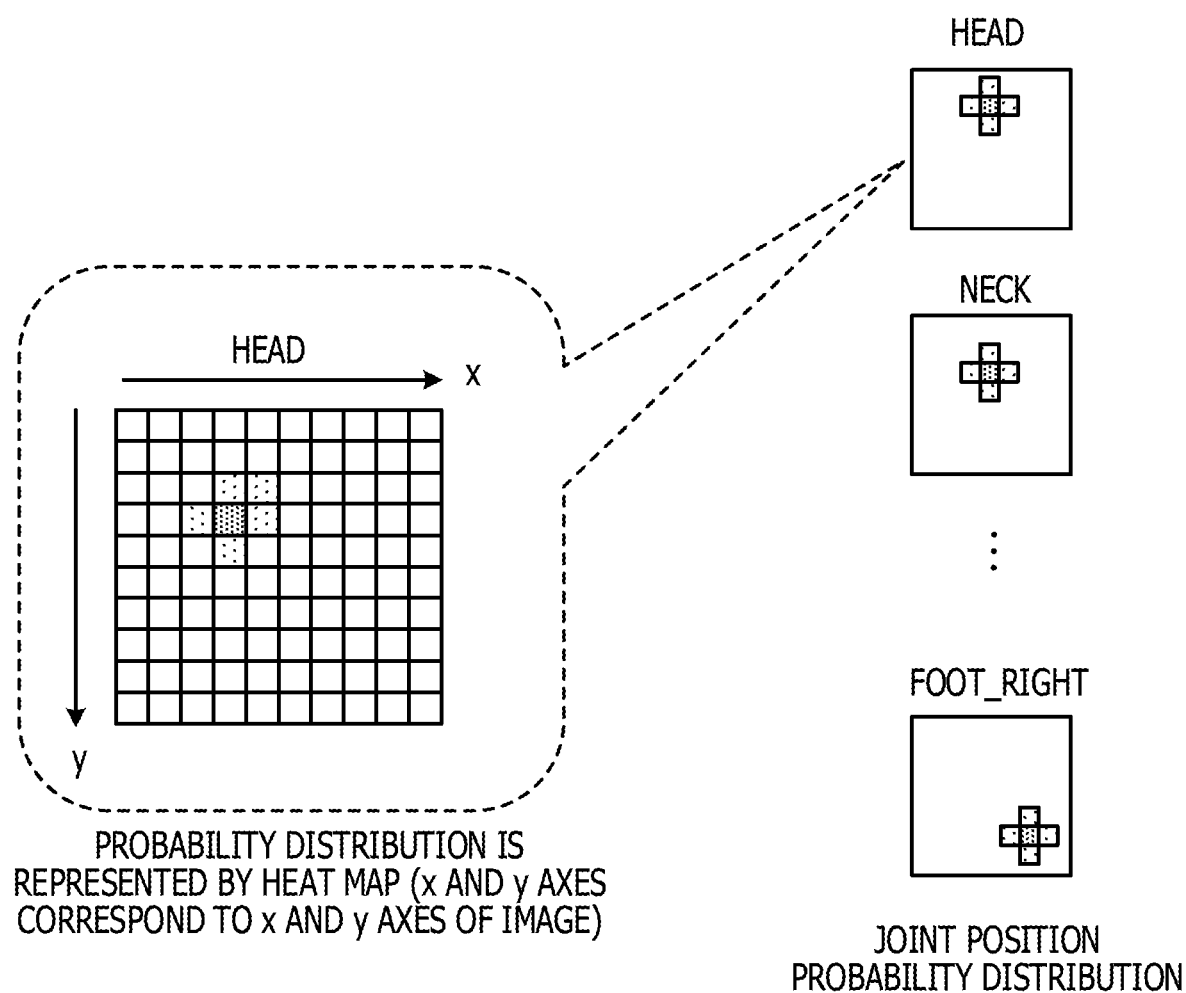
FIG. 6 is a view illustrating an example for explaining a joint position probability distribution.

Here, the relationship between the human body model used in the joint position estimation model and the joint position probability distribution will be described. FIG. 3 illustrates the model of the human body. In FIG. 3, for example, a joint of the human body is indicated by a "point," and a part (e.g., a limb or a torso) coupled with adjacent joints is indicated by a "straight line." In the example of FIG. 3, the respective joints are numbered, starting with the number "1" for the head. Hereinafter, description will be made using the graphical model of the human body. In FIG. 7, the probability distribution calculation unit 260 evaluates the image 32 of the human body photographed by the camera 31 by using the joint position estimation model 300, so as to calculate the score indicating the precision as to where each joint exists in the image. For the joint position estimation model, for example, a deep neural network (DNN) or template matching may be used. In the present embodiment, a convolution neural network (CNN) which is a kind of the DNN is used. For example, in the present embodiment, the probability distribution calculation unit 260 evaluates a consistency between the image of the human body and the joint position estimation model 300 using the CNN, so as to calculate the score indicating the precision as to where a joint such as the head or neck exists in the image. The joint position estimation model 300 may be obtained by learning each joint site in advance using the CNN. The joint position estimation model 300 is stored in the storage unit 240. The probability distribution calculation unit 260 obtains a joint position probability distribution of the head in the input image by using the joint position estimation model 300 obtained from a learning of the head using the CNN. Similarly to the head, the probability distribution calculation unit 260 obtains joint position probability distributions of the other joints by using the joint position estimation model 300 obtained from the learning using the CNN. For example, in the joint position probability distribution of the head, a point having the highest probability becomes a location which is highly likely to correspond to the position of the head in the image. The probability distribution calculation unit 260 estimates a position of each joint by searching for the maximum value of the joint position probability distribution function for each joint. FIG. 6 illustrates an output state of the joint position probability distribution. The joint position probability distribution is output for each joint. The joint position probability distribution may be represented by, for example, a heat map. For example, a location may be expressed in red as the location has a high probability, and may be expressed in blue as the location has a low probability.

Descriptions have been made on the procedure in which the probability distribution calculation unit 260 calculates the joint position probability distribution without using the joint type. However, when the relative position score calculation unit 270 and the transition score calculation unit 280 which are described below use the joint type, the probability distribution calculation unit 260 may also use the joint type. When the joint type is used, a joint type position probability distribution illustrated in FIG. 9 referred-to to describe the relative position score calculation unit 270 below is used.

<<<Relative Position Score Calculation Unit>>>

The relative position score calculation unit 270 evaluates the consistency of a relative position relationship among the joints of the object in a frame by using the joint type relative position model 310. Then, the relative position score calculation unit 270 calculates the precision of an existence position of a joint as a relative position score. The calculated relative position score is provided for the process of the pose estimation unit 290. The joint type relative position model 310 is expressed by the joint relative position score function (tpQ) described above. The joint type relative position model 310 may be obtained by the learning in the learning apparatus to be described later. In addition, the means for acquiring the joint type relative position model 310 is not limited thereto, and for example, a model prepared in advance by another learning apparatus may be used.

Referring back to FIG. 7, the procedure for calculating a relative position score 36 will be described. Descriptions will be made with reference to an example where the consistency of the relative position relationship among joints is evaluated by using the joint type. Further, descriptions will be made with reference to a flowchart illustrating an example of the estimation of the pose of the human body in FIGS. 19A and 19B as well. By using the joint type relative position model 310 (step S210), the relative position score calculation unit 270 evaluates the consistency of a position between a joint type of a joint and a joint type of an adjacent joint adjacent to the joint within the same frame of the input image 32 (step S230). As a result, the relative position score calculation unit 270 evaluates the precision of the existence position of a joint from the relative position among the joint types, and calculates the degree of the precision as the relative position score (ψ) 36 (step S240).

Figure 8:
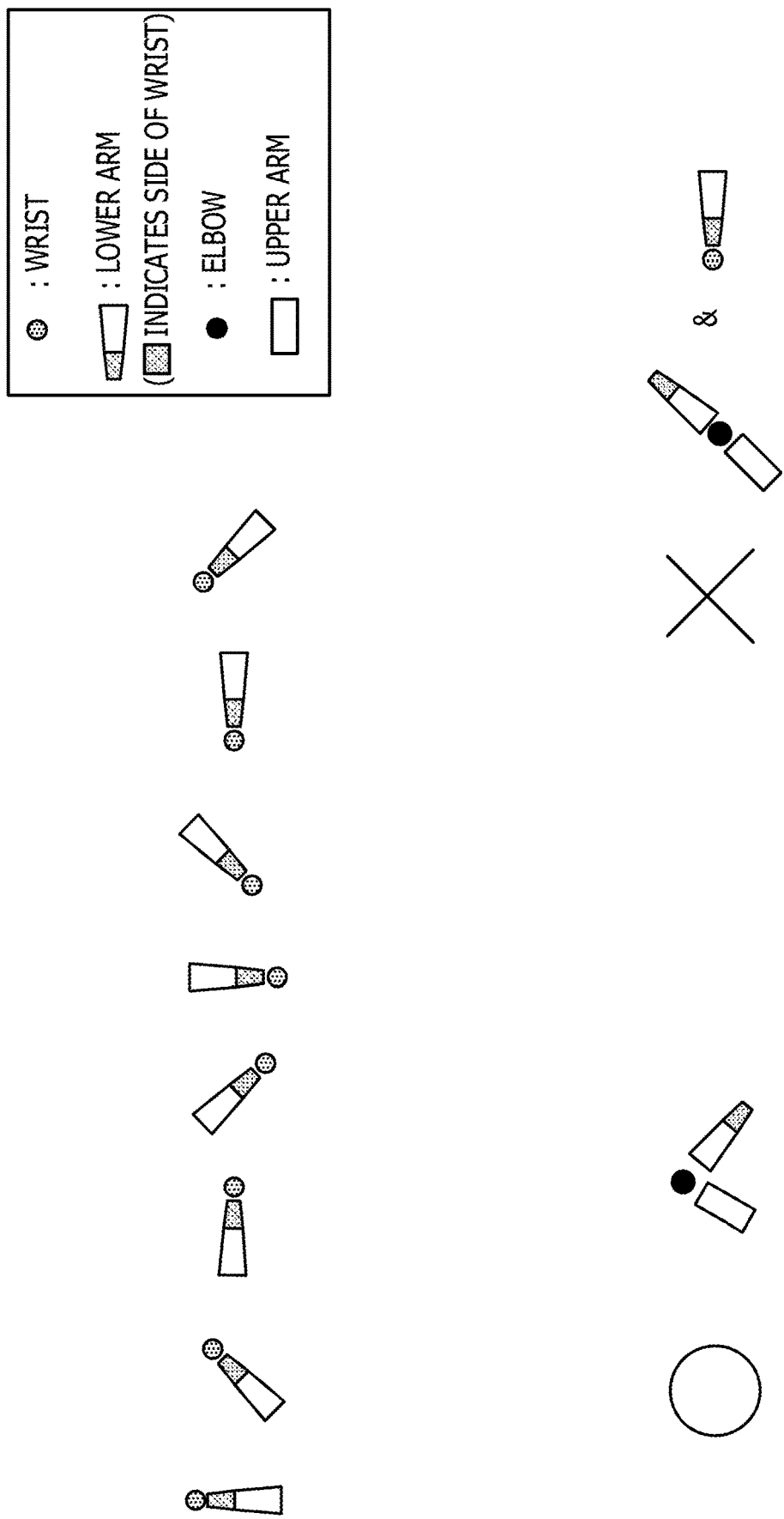
FIG. 8 is a view illustrating an example for explaining an evaluation of a consistency of a joint type within the same frame.

Here, the joint type used in the joint type relative position model will be described. As described above, the joint type is a preset pattern of the appearance of the connection between a joint and a part connected to the joint. A plurality of joint types is set for each joint of the human body. The upper part of FIG. 8 illustrates, for example, types of the wrist. In FIG. 8, eight wrist types directed toward eight directions, respectively, are set. The lower part of FIG. 8 illustrates a comparison between a type of the elbow and a type of the wrist. For example, in the lower left view, it can be seen that the type of the elbow and the type of the wrist are consistent with each other. Meanwhile, in the lower right view, the type of the elbow and the type of the wrist are inconsistent with each other. In this manner, the relative position score calculation unit 270 evaluates the consistency of the joint type among adjacent joints, by using the joint types preset for each joint. By evaluating the consistency using the joint types, the relative position score calculation unit 270 may exclude a combination of joint types which do not exist in the human body. As a result, the relative position score calculation unit 270 may obtain a probable joint position.

Figure 9:
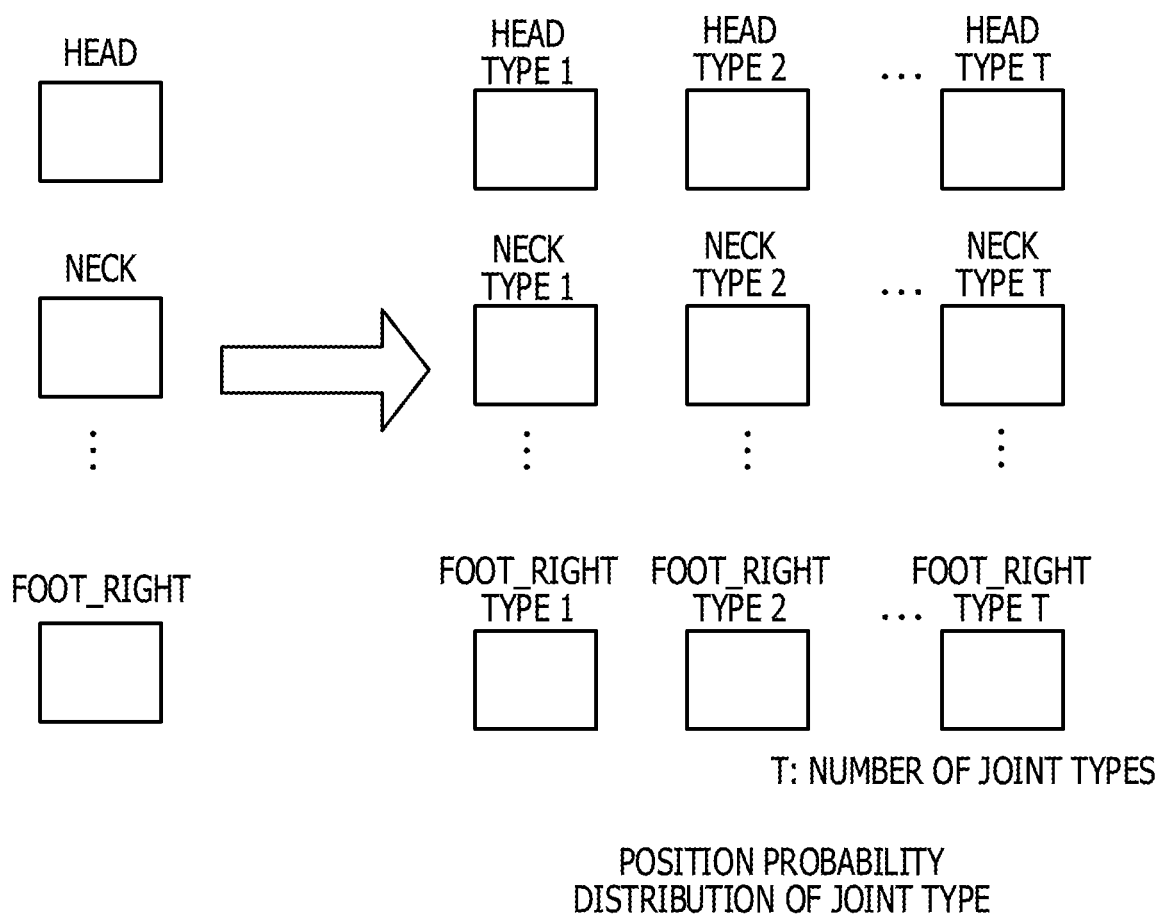
FIG. 9 is a view illustrating an example for explaining a joint position probability distribution when a joint type is introduced.

FIG. 9 illustrates a joint position probability distribution when the joint types are introduced. When the number of the joint types is T, the number of the probability distributions increases by T times.

Figure 10:
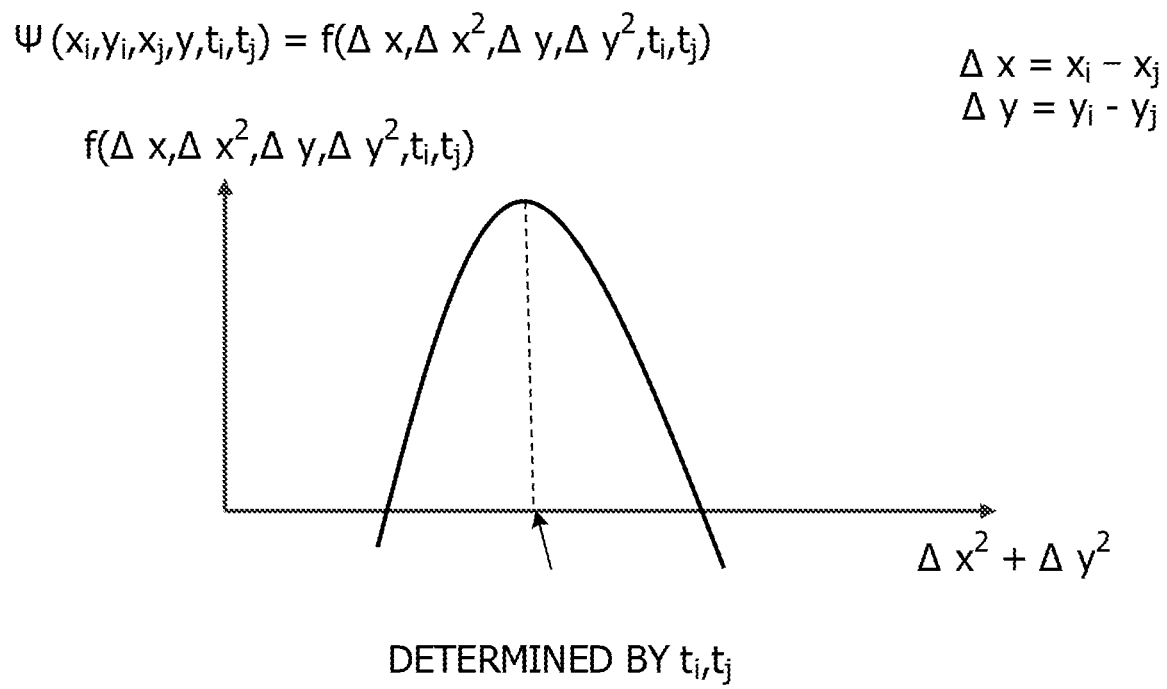
FIG. 10 is a view illustrating an example of a joint position relative score function.

FIG. 10 illustrates the joint relative position score function. The joint relative position score function is expressed as a function of which the value increases when the relative position of a joint is suitable for the type of the joint. For example, the joint relative position score function is a function which is output such that, when the consistency of the relative position among joints is evaluated by using the joint types and the consistency is obtained, the relative position score increases as illustrated in FIG. 10. In the joint relative position score function of FIG. 10, the relative position score is obtained by inputting the difference of a position among the joints (A) and a square thereof, and two joint types. The score function obtained by the linear combination of the joint position probability distribution function and the joint relative position score function is expressed by, for example, the following equation (1).

[Equation (1)]

$$F(x, y, t) = \underbrace{\sum_{i \in joints} \phi(x_i, y_i, t_i)}_{\text{Joint Position Probability Distribution Function}} + \underbrace{\sum_{i,j \in parts} \psi(x_i, y_i, x_j, y_j, t_i, t_j)}_{\text{Joint Relative Position Score Function}} \quad (1)$$

Equation (1) above is an equation for evaluating the precision of the existence position of a joint when an arbitrary joint type and coordinates thereof are selected from the joint position probability distribution. The first term evaluates the probability distribution of a joint position, and the second term evaluates the relative position of a joint. By obtaining x, y, and t that maximizes the evaluation equation, the most probable joint position may be obtained. Here, "x" indicates an x coordinate, "y" indicates a y coordinate, and "t" indicates a type, i.e., a joint type.

<<<Transition Score Calculation Unit>>>

The transition score calculation unit 280 evaluates the consistency of the transition of the same joint of the object in different frames, by using the joint type transition model 320. Then, the precision of the transition of the same joint is calculated as a transition score. The calculated transition score is provided for the process of the pose estimation unit 290. In addition, the joint type transition model 320 is expressed by the joint type transition score function (ξ( )) described above. The joint type transition model 320 may be obtained by a learning in the learning apparatus 100 to be described later. The learning apparatus 100 will be described later.

Referring back to FIG. 7, the procedure for calculating a transition score 38 will be described. Descriptions will be made with reference to an example where the consistency of the transition of a joint among different frames is evaluated by using the joint types. Further, descriptions will be made with reference to a flowchart illustrating an example of the estimation of the pose of the human body in FIGS. 19A and 19B as well. The transition score calculation unit 280 evaluates the consistency of the transition of the joint by using transition information of the same joint of the object among different frames. For example, by using the joint type transition model 320 which is the transition information of the joint (step S310), the consistency of the transition of the same joint from a position and a joint type before the transition to a position and a joint type after the transition among different frames of the input image 32 is evaluated (step S330). As a result, the transition score calculation unit 280 evaluates, regarding the same joint, the precision of the existence position of the same joint before and after the transition, and calculates the degree of the precision as a transition score (ξ) 38 (step S340).

The joint type transition model 320 which is the transition information may be obtained by using pre-collected learning data. The joint type transition model 320 is represented by the movement amount of the same joint from the position in the frame before the transition to the position in the frame after the transition, and the joint type transition score function expressed by a weight value obtained in advance through a learning for each transition of a joint. The transition score calculation unit 280 evaluates the consistency of the transition of the joint type in the input image by using the joint type transition model 320, so as to obtain the degree of the precision of the joint position before and after the transition as the transition score. The transition score may be obtained by, for example, the inner product of the movement amount of the same joint and the weight value in the joint type transition score function.

Hereinafter, the method of creating the joint type transition model 320 will be described. For example, the learning apparatus 100 extracts transition information on each joint position and a joint type and information of a movement amount, in the preceding and succeeding frames of a frame to be subjected to the pose estimation, from a learning image. FIG. 11 illustrates an example of the transition and the movement amount of a joint type. In FIG. 11, the upper left view illustrates a frame N, and the upper right view illustrates a frame N+1. The view in the lower part of FIG. 11 indicates the movement amount among the frames. Here, for the simplification of the descriptions, FIG. 11 illustrates a case where only the knee and the ankle have been moved.

Table 1 below represents an example of the calculation of the transition and the movement amount of a joint type.

TABLE 1

Position and Type of Joint $I_{l\text{-}knee}$ at time N
$(x_N, y_N)$
type0
Position and Type of Joint $I_{l\text{-}knee}$ time N + 1
$(x_{N+1}, y_{N+1})$
type1
Type transition of $I_{l\text{-}knee}$ and Definition of Movement Amount
$(\Delta x_N, \Delta x_N^2, \Delta y_N, \Delta y_N^2)$
$\Delta x_N = (x_{N+1} - x_N), \Delta y_N = (y_{N+1} - y_N)$
Type transition: type0→type1

For example, in a case where an attention is paid to of I-knee (left knee), it is assumed that the position and the joint type (also referred to as "type") of the joint at a time N are $(x_N, y_N)$ type 0. It is assumed that the position and the type of the joint at a time N+1 are $(x_{N+1}, y_{N+1})$ type1. From this information, the movement amount and the type transition (transition information from a type to another type) of the I-knee are as follows. Movement amount: $(\Delta x_N, \Delta x_N^2, \Delta y_N, \Delta y_N^2)$; and Type transition: type0→type1. Here, $\Delta x_N = (x_{N+1}-x_N)$, and $\Delta y_N=(y_{N+1}-y_N)$. In this way, the movement amount and the type transition of the joint position are defined.

Figure 12:
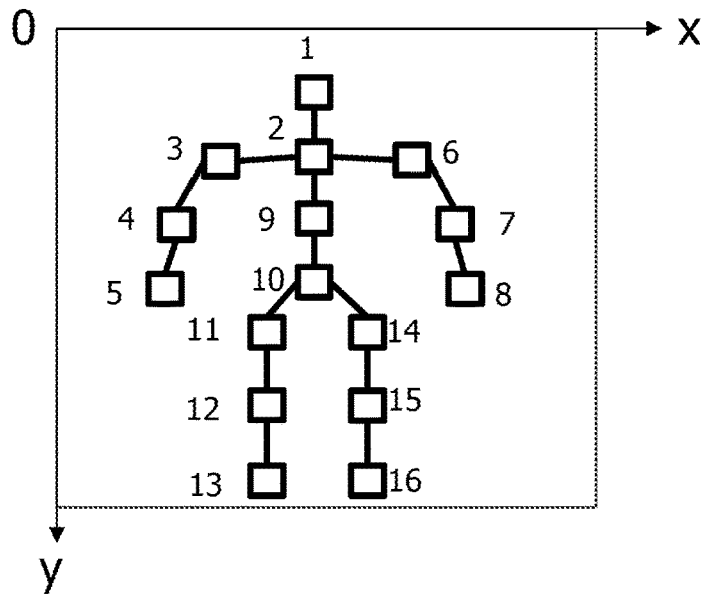
FIG. 12 is a view illustrating an example for explaining each joint of the human body model which is associated with a position and a joint type.
Figure 13:
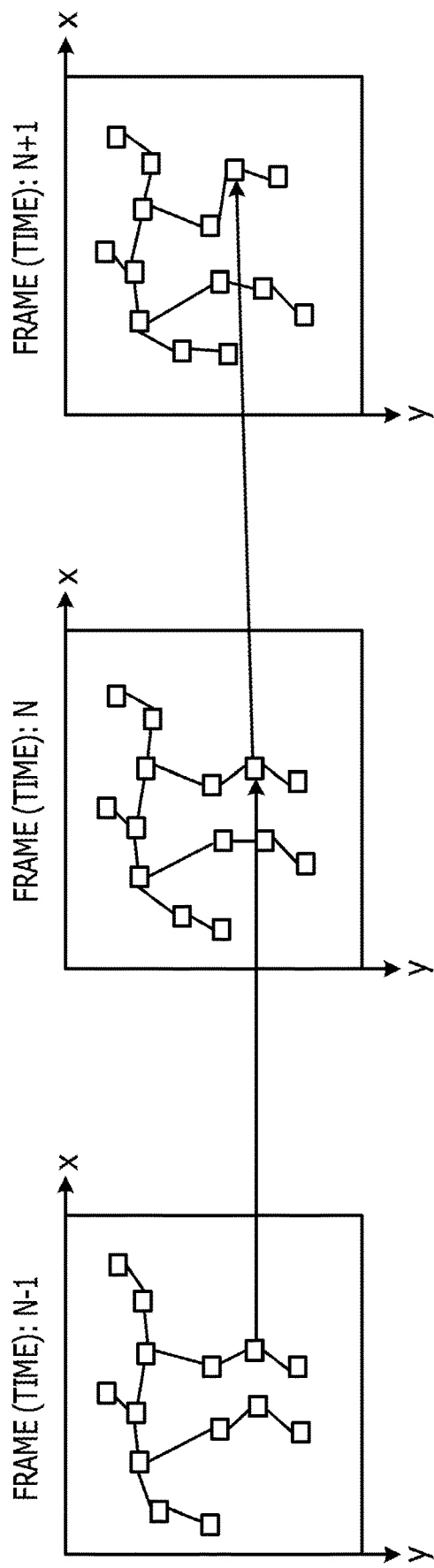
FIG. 13 is a view illustrating an example for explaining an extraction of a learning data set.
Figure 14:
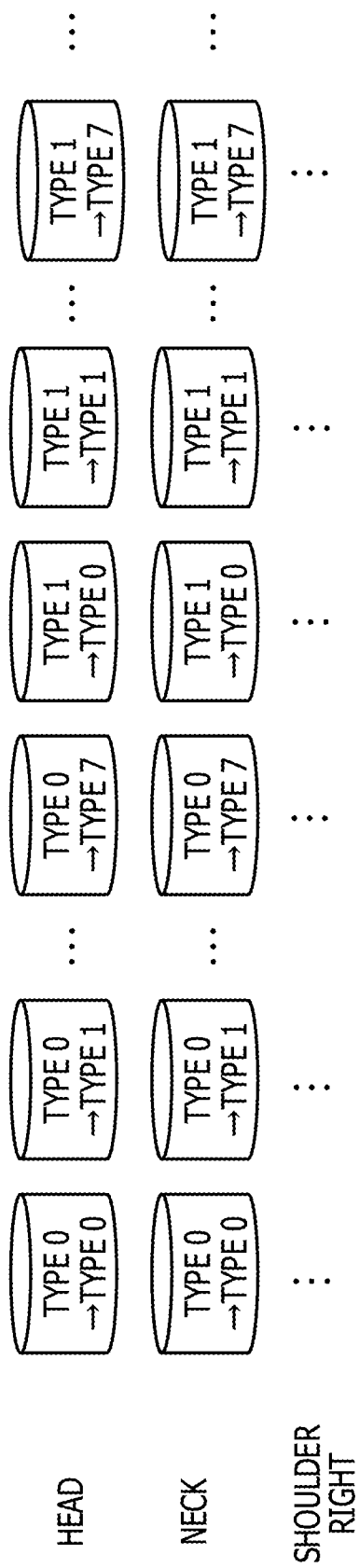
FIG. 14 is a view illustrating an example for explaining a database obtained from the extracted learning data set ("type transition database")

Next, the generation of a learning data set will be described. Here, it is assumed that a frame of a moving image to be learned is associated with a position, a type, and a joint number of each joint of the human body. FIG. 12 illustrates an example of the association. In FIG. 12, x, y indicates a position in the image. FIG. 13 illustrates an example of an extraction of a learning data set. For example, a learning data set is acquired by extracting a type transition and a movement amount of each joint among all image frames. FIG. 14 illustrates a database obtained from the extracted learning data set (hereinafter, also referred to as a "type transition DB"). A learning data set in which the movement amount is obtained for each joint and each transition among types is created. For example, FIG. 14 illustrates a part of the type transition DB in a case where the number of the types is eight. In this way, the type transition DB that stores the movement amount and the type transition of each joint to be used for the learning is defined.

Next, the joint type transition score function for performing the joint estimation by using the movement amount and the type transition of a joint position, and the type transition DB obtained by extracting the movement amount and the type transition of a joint position, which have been defined so far, will be defined. The joint type transition score function is expressed as, for example, the following equation (2).

[Equation (2)]

$$S(x, y, t, n) = \sum_{i \in V, n \in T} \xi(x_i, y_i, t_i, n, n-1) \quad (2)$$

x: x coordinate
y: y coordinate
t: type
n: frame
V: joint group
T: frame group (N − 1, N, N + 1;
    N is a number of a frame to be subjected to pose estimation)

The joint type transition score function evaluates the movement amount and the type transition of a corresponding joint in the preceding and succeeding frames. This function is expressed as a function of which value increases when the movement amount and the type transition of a joint are highly correlated to the learning result, with respect to an input image.

The equation of ξ is expressed by the following equation (3).

[Equation (3)]

$$\xi(x_i, y_i, t_i, n, n-1) = w_1 \Delta x_n + w_2 \Delta x_n^2 + w_3 \Delta y_n + w_4 \Delta y_n^2 \quad (3)$$

x: x coordinate
y: coordinate
t: type
n: frame

The symbol ξ is expressed by an inner product of the movement amount of the same joint and the vector of the weight value "w" in the joint type transition score function. The weight value "w" ($w_1$, $w_2$, $w_3$, and $w_4$) is determined by performing a learning using the type transition DB. As the method of determining "w," an existing learning method may be used, and for example, a method such as a least square method, a genetic algorithm (GA), or simulated annealing may be used. The method of determining "w" is not limited.

Figure 15:
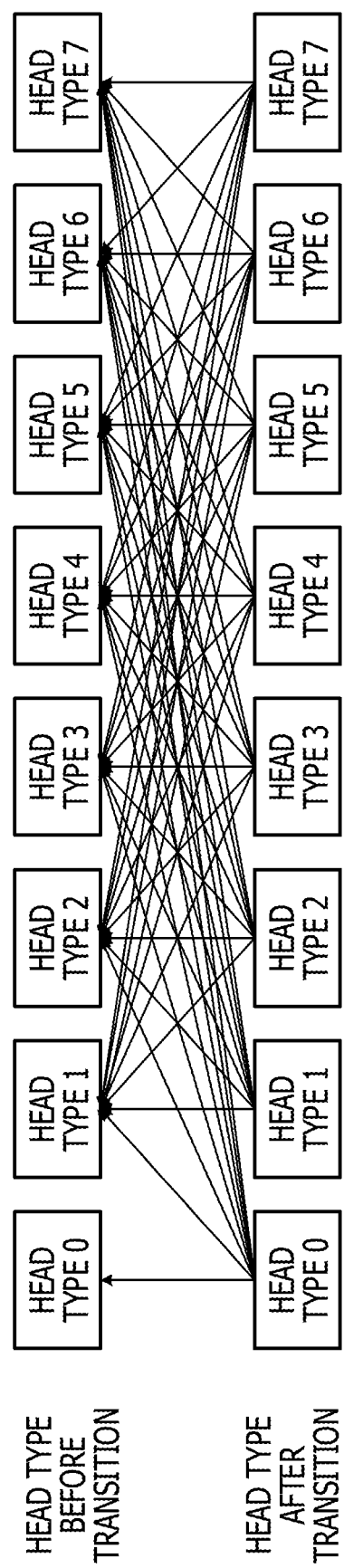
FIG. 15 is a view illustrating an example for explaining a relationship between a weight value "w" used for calculating a transition score and a joint type in a case of the head.

FIG. 15 illustrates a relationship between the weight value "w" and the joint type in the head. In FIG. 15, the upper part represents the head type after the transition, and the lower part represents the head type before the transition. The different weight values $w_1$, $w_2$, $w_3$, and $w_4$ are determined by a learning for all the transitions (the arrows in FIG. 15), respectively. The "w" is determined by a learning among all the joints such as among the necks and among the shoulders right, in addition to among the heads. The weight value "w" of the joint type transition score function is determined by the learning from the movement amount and the type transition extracted from the learning data. The joint type transition score function is obtained as described above. The transition score calculation unit 280 evaluates the consistency of the transition position among the same joints in different frames by using the joint type transition score function. In the transition score calculation unit 280, when the consistency is obtained, a high transition score is output.

<<<Pose Estimation Unit>>>

The pose estimation unit 290 estimates the most probable position of a joint based on the score of the probability distribution, the relative position score, and the transition score which are obtained as described above. For example, the pose estimation unit 290 performs the pose estimation by using a total score function obtained by linearly combining the joint position probability distribution function, the joint relative position score function, and the joint type transition score function.

Referring back to FIG. 7, the procedure of the process in the pose estimation unit 290 will be described. Further, descriptions will be made with reference to a flowchart illustrating an example of the estimation of the pose of the human body in FIGS. 19A and 19B as well.

The pose estimation unit 290 uses a solution candidate of the score of the probability distribution obtained from the joint position probability distribution function, a solution candidate of the relative position score obtained from the joint relative position score function, and a solution candidate of the transition score obtained from the joint type transition score function. The pose estimation unit 290 searches for the maximum value of the total score function by using the solution candidates (step S410). For example, the pose estimation unit 290 searches for (x, y, t) that maximizes the total score function. By searching for the maximum value of the total score function, the pose estimation unit 290 estimates the most probable position of a joint in consideration of the position of the joint within a frame, the consistency of the relative position among joints in a frame, and the consistency of the transition of the joint among frames. Accordingly, the pose estimation unit 290 outputs the result of the pose estimation (step S420). The pose estimation unit 290 may estimate the pose of the human body with the high precision.

The total score function including the joint type transition score function defined by the equation (3) above is expressed by the following equation (4). The total score function F is a function obtained by linearly combining the joint position probability distribution function, the joint relative position score function, and the joint type transition score function.

[Equation (4)]

$$F(x, y, t, n) = \underbrace{\sum_{i \in V} \phi(x_i, y_i, t_i)}_{\text{Joint Position Probability Distribution Function}} +$$

$$\underbrace{\sum_{i,j \in E} \psi(x_i, y_i, t_i, x_j, y_j, t_j)}_{\text{Joint Relative Position Score Function}} + \underbrace{\sum_{i \in V, n \in T} \xi(x_i, y_i, t_i, n, n-1)}_{\text{Joint Type Transition Score Function}}$$

x: x coordinate
y: y coordinate
t: type
n: frame
V: joint group
E: group of straight lines connecting joints with each other
T: frame group (N − 1, N, N + 1;
   N is a number of a frame to be subjected to pose estimation)

The pose estimation unit 290 may estimate the most probable position of a joint by searching for the position of the joint at which the score of the total score function is the highest.

Figure 16:
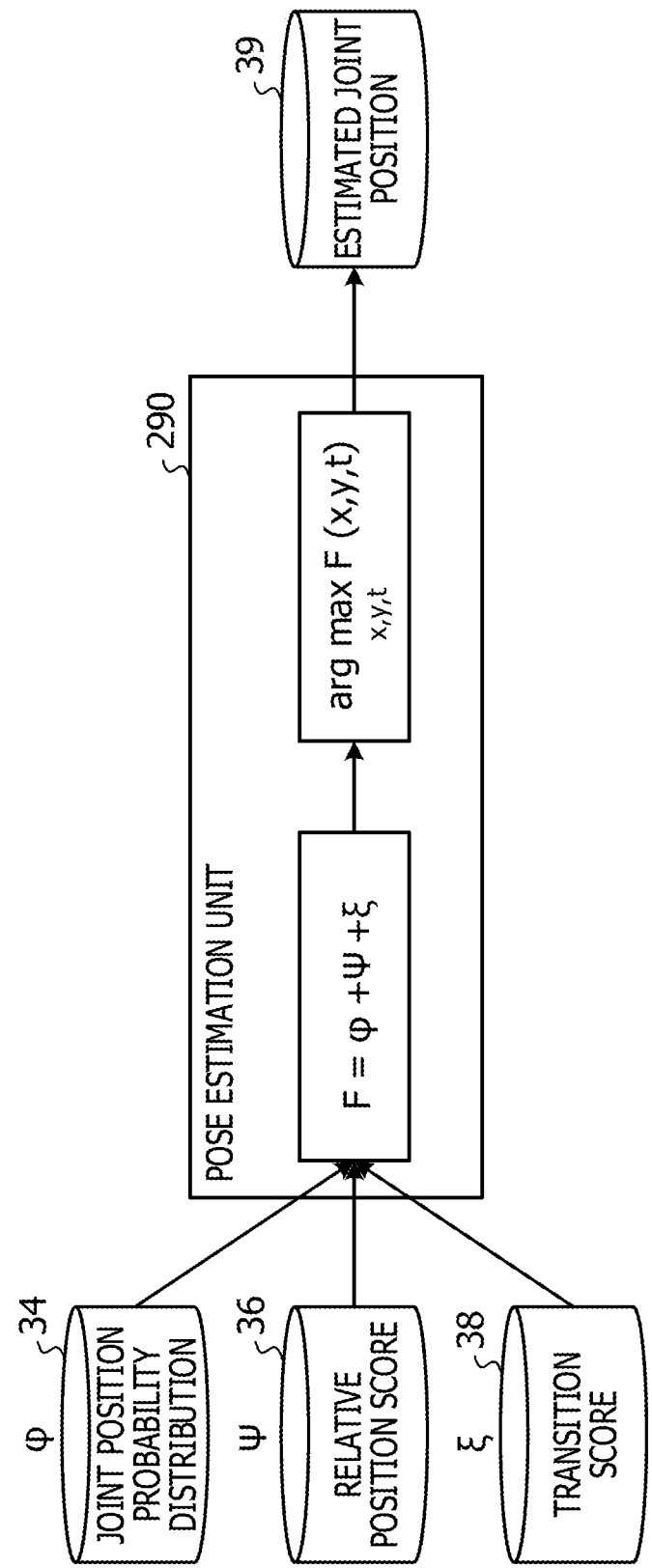
FIG. 16 is a view illustrating an example for explaining a process of estimating a position of a joint in a pose estimation unit.

FIG. 16 illustrates the flow of a process of searching for the maximum value of the total score function F. As illustrated in FIG. 16, (x, y, t) that maximizes the total score function F is searched for by using a solution candidate of the score of the joint position probability distribution (φ), a solution candidate of the relative position score (ψ), and a solution candidate of the transition score (ξ) One of the simplest methods of searching for (x, y, t) that maximizes the F may be a full search. In the full search, when the searching time is long, an algorithm such as Monte Carlo, max-sum, expectation-maximization (EM), or GA may be used. However, any method may be used as long as the method relates to obtaining (x, y, t) that maximizes the evaluation equation.

In the present embodiment, when the relative position score calculation unit 270 and the transition score calculation unit 280 evaluate the consistency by using the joint types, the probability distribution calculation unit 260 uses the joint position estimation model 300 of the joint types. The pose estimation unit 290 searches for (x, y, t) that maximizes the F, so as to estimate the most probable position 39 of the joint from the result of the estimation of the joint position and the joint type. As a result, the pose estimation unit 290 may output the estimation result of the pose of the human body (step S420).

Next, the learning apparatus 100 will be described.
<Learning Apparatus>

The learning apparatus 100 generates the joint type transition model 320 by a learning. Further, the learning apparatus 100 may generate the joint position estimation model 300 or the joint type relative position model 310, in addition to the joint type transition model 320. As for a hardware configuration of the learning apparatus 100, the learning apparatus 100 includes a CPU, a main storage device, an auxiliary storage device, an input device, an output device, and a communication I/F, as in the above-described information processing apparatus 200. These respective units are coupled to each other through a bus. Since the descriptions of each of the CPU, the main storage device, the auxiliary storage device, the input device, the output device, and the communication I/F are similar to those for the above-described information processing device 200, the descriptions will be omitted.

In addition, the learning apparatus 100 may be a part of a cloud system which is a group of computers on a network.
<<Functional Configuration of Learning Apparatus>>

Referring back to FIG. 1, a functional configuration of the learning apparatus 100 will be described. The learning apparatus 100 includes a controller 130 and an output unit 150. The controller 130 controls the entire learning apparatus 100.

The controller 130 includes a model learning unit 140. The model learning unit 140 generates the joint type transition model 320 through a learning, by using the learning data stored in the learning database (also referred to as the learning DB) 120. The learning DB also includes the information of the type transition DB described above. The process of generating the joint type transition model 320 is as described above. As a result of the learning by the model learning unit 140, the obtained joint type transition model 320 is output to the information processing apparatus 200 by the output unit 150.

Figure 19A:
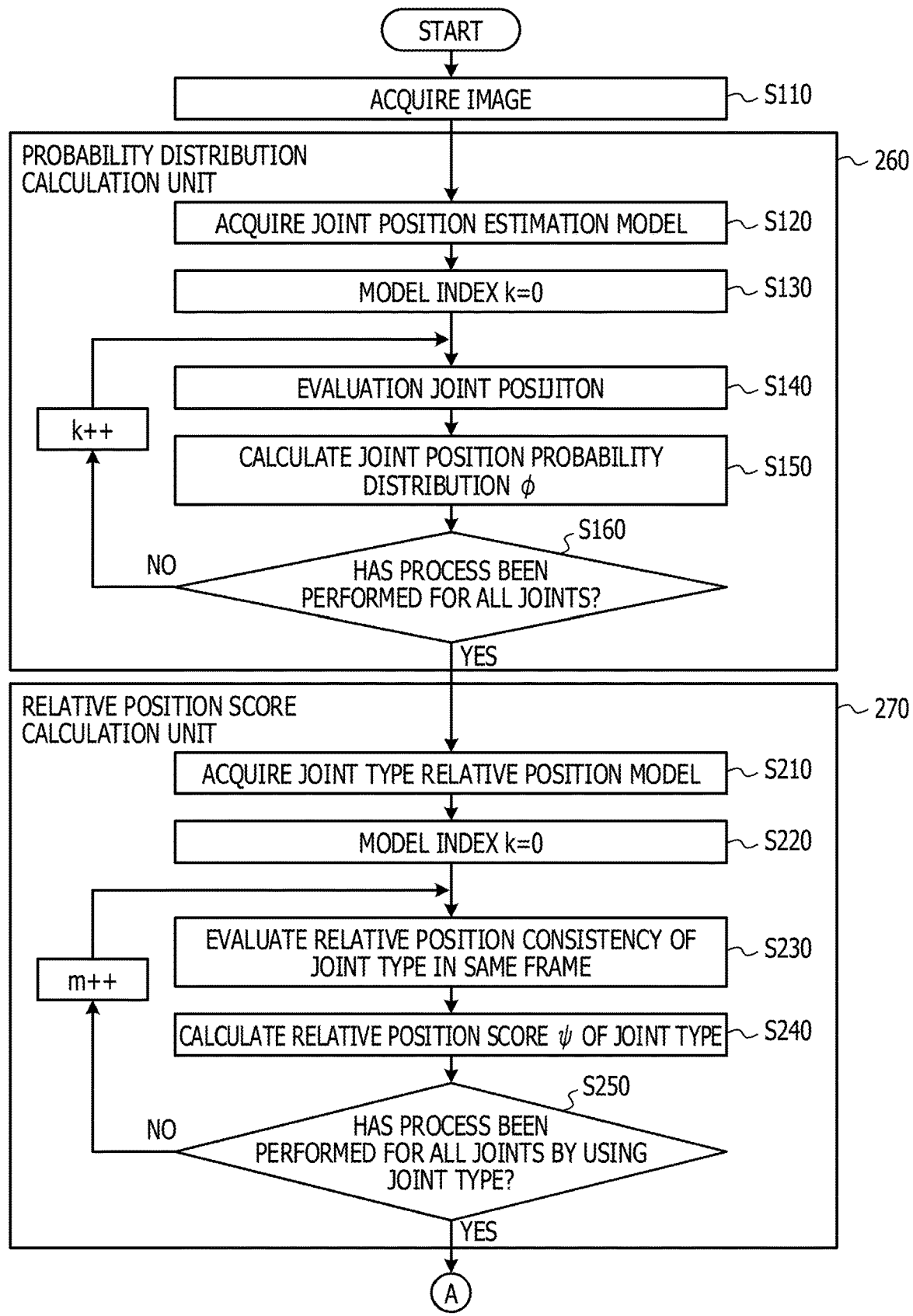
FIGS. 19A and 19B are a flowchart illustrating an example of a flow of a process of estimating a pose of the human body by using the information processing apparatus.
Figure 19B:
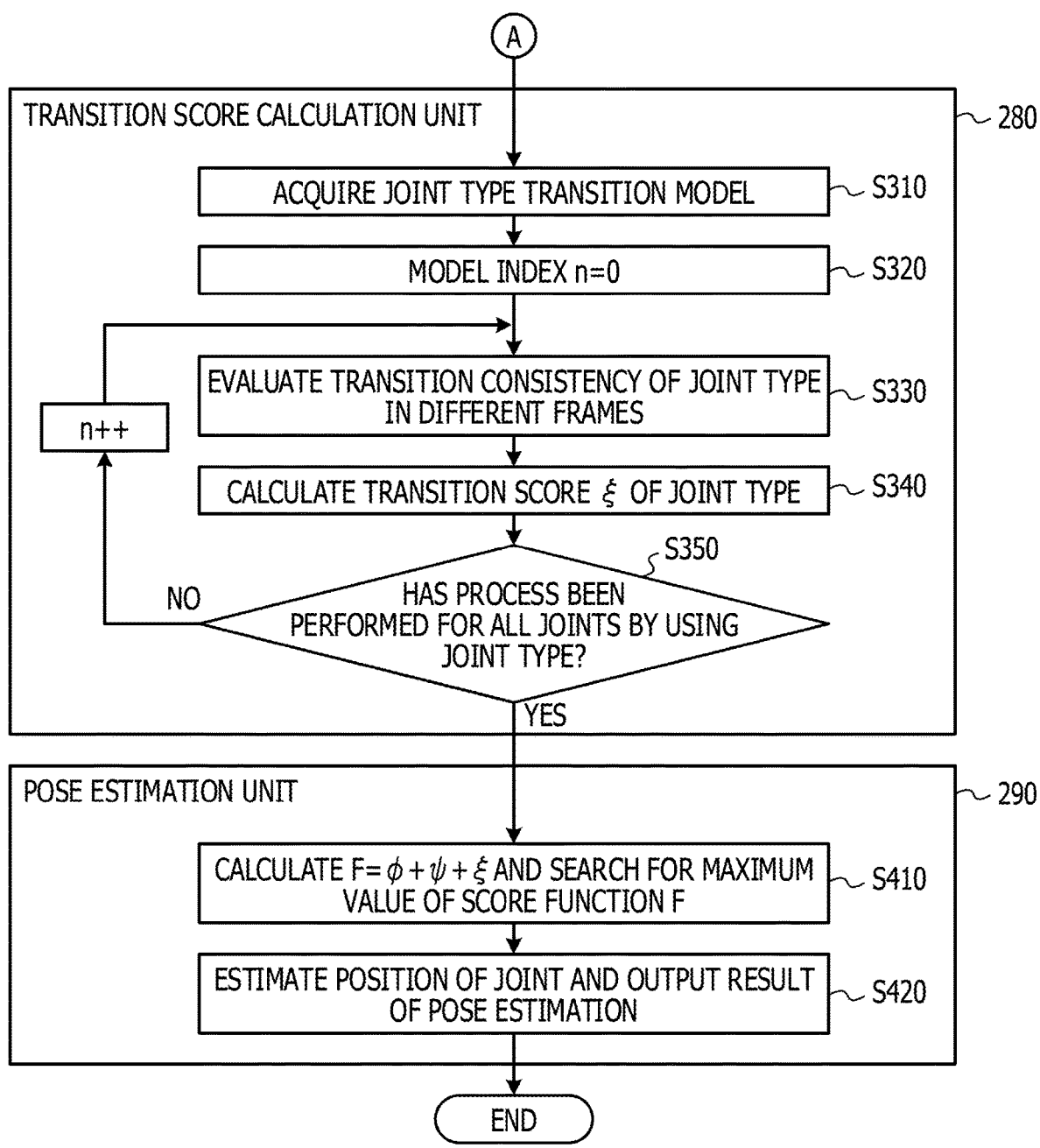

FIGS. 19A and 19B are a flowchart illustrating an example of a flow of the process of estimating the pose of the human body by the information processing apparatus. Hereinafter, description will be made with reference to FIGS. 1, 7, and 16.

In step S110, the input unit 220 of the information processing apparatus 200 acquires a moving image (an image having a plurality of frames) in which the human body appears, and the process proceeds to S120.

In step S120, the probability distribution calculation unit 260 of the information processing apparatus 200 reads and acquires the joint position estimation model 300 stored in the storage unit 240, and the process proceeds to S130.

In step S130, the probability distribution calculation unit 260 initializes a model index "k" for discriminating the joint position estimation model 300 read in step S120 to "0," and the process proceeds to S140.

In step S140, the joint recognition unit 33 of the probability distribution calculation unit 260 evaluates the joint position in a frame of the input image by using the joint position estimation model 300, and the process proceeds to S150.

In step S150, the joint recognition unit 33 of the probability distribution calculation unit 260 calculates the joint position probability distribution φ34 indicating the precision of the existence position indicating where the joint exists in the image, based on the evaluation of the joint position in step S140. Then, the process proceeds to S160.

In step S160, the probability distribution calculation unit 260 determines whether the process of calculating the joint position probability distribution φ34 has been performed for all the joints, and when it is determined that all the processes have been completed, the process proceeds to S210. When it is determined that all the processes have not been completed, the probability distribution calculation unit 260 sets the model index to k+1 such that the process returns to S140, and the process of calculating the joint position probability distribution φ34 is continued for an unprocessed joint.

In step S210, the relative position score calculation unit 270 of the information processing apparatus 200 reads and acquires the joint type relative position model 310 stored in the storage unit 240, and the process proceeds to S220.

In step S220, the relative position score calculation unit 270 initializes a model index "m" for discriminating the joint type relative position model 310 read in step S210 to "0," and the process proceeds to S230.

In step S230, the relative position consistency evaluation unit 35 of the relative position score calculation unit 270 evaluates the consistency of the relative position relationship of joint types of adjacent joints in the frame of the input image, by using the joint type relative position model 310, and the process proceeds to S240.

In step S240, the relative position consistency evaluation unit 35 of the relative position score calculation unit 270 calculates a relative position score ψ36 indicating the precision of the existence position of the joint from the relative position among the joint types, based on the evaluation in step S230, and the process proceeds to S250.

In step S250, the relative position score calculation unit 270 determines whether the process of calculating the relative position score ψ36 has been performed for all the joints, and when it is determined that all the processes have been completed, the process proceeds to S310. When it is determined that all the processes have not been completed, the relative position score calculation unit 270 sets the model index to m+1 such that the process returns to S230, and the process of performing the evaluation using the joint types and calculating the relative position score ψ36 is continued for an unprocessed joint.

In step S310, the transition score calculation unit 280 of the information processing apparatus 200 reads and acquires the joint type transition model 320 stored in the storage unit 240, and the process proceeds to S320.

In step S320, the transition score calculation unit 280 initializes a model index "n" for discriminating the joint type transition model 320 read in step S310 to "0," and the process proceeds to S330.

In step S330, the transition consistency evaluation unit 37 of the transition score calculation unit 280 evaluates the consistency of the transition of the joint type of the same joint among different frames of the input image, by using the joint type transition model 320, and the process proceeds to S340.

In step S340, based on the evaluation in step S330, the transition consistency evaluation unit 37 of the transition score calculation unit 280 calculates, regarding the same joint, a transition score ξ38 indicating the precision of the existence position of the joint before and after the transition, and the process proceeds to S350.

In step S350, the transition score calculation unit 280 determines whether the process of calculating the transition score has been performed for all the joints, and when it is determined that all the processes have been completed, the process proceeds to S410. When it is determined that all the processes have not been completed, the transition score calculation unit 280 sets the model index to n+1 such that the process returns to S330, and the process of performing the evaluation using the joint types and calculating the transition score is continued for an unprocessed joint.

In step S410, the pose estimation unit 290 of the information processing apparatus 200 estimates the position of the joint by using the total score function obtained by linearly combining the joint position probability distribution function, the joint relative position score function, and the joint type transition score function. The pose estimation unit 290 uses a solution candidate of the score of the probability distribution obtained from the joint position probability distribution function, a solution candidate of the relative position score obtained from the joint relative position score function, and a solution candidate of the transition score obtained from the joint type transition score function. In step S410, the pose estimation unit 290 searches for the maximum value of the total score function by using the solution candidates, and the process proceeds to S420. In step S410, the pose estimation unit 290 searches for (x, y, t) that maximizes the total score function F.

In step S420, the pose estimation unit 290 estimates the most probable position of the joint from the estimation result of the joint position by the search for the maximum value and the joint type in S140. As a result, the pose estimation unit 290 outputs the estimation result of the pose of the human body, and the process is ended.

Second Embodiment

In the first embodiment, the x and y coordinates are used for specifying the position of the joint. Meanwhile, the position of the joint may be specified by further using a z coordinate of a depth. Here, "z" represents a depth value when a depth image is used. The second embodiment is the same as the first embodiment, except that in the second embodiment, the position of the joint is specified by (x, y, z). Thus, the descriptions of the same configuration as that of the first embodiment described above will be omitted. Hereinafter, descriptions will be made focusing on the difference from the first embodiment.

Table 2 below represents an example of the calculation of the transition and the movement amount of the joint type.

TABLE 2

| Position and Type of Joint $I_{l\text{-}knee}$ at time N |
| --- |
| $(x_N, y_N, z_N)$ |
| type0 |
| Position and Type of Joint $I_{l\text{-}knee}$ at time N + 1 |
| $(x_{N+1}, y_{N+1}, z_{N+1})$ |
| type1 |
| Type transition of $I_{l\text{-}knee}$ and Definition of Movement Amount |
| $(\Delta x_N, \Delta x_N^2, \Delta y_N, \Delta y_N^2, \Delta z_N, \Delta z_N^2)$ |
| $\Delta x_N = (x_{N+1} - x_N), \Delta y_N = (y_{N+1} - y_N), \Delta z_N = (z_{N+1} - z_N)$ |
| Type transition: type0→type1 |

Figure 17:
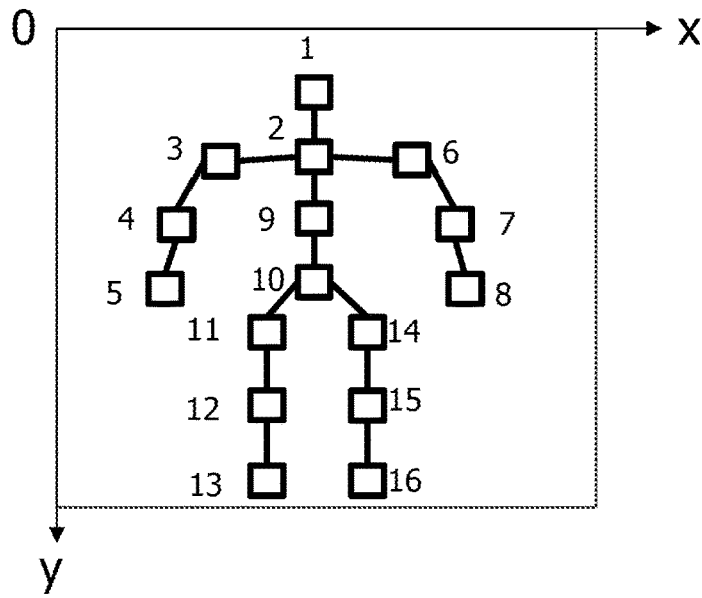
FIG. 17 is a view illustrating an example for explaining each joint of the human body model which is associated with a position and a joint type.

For example, in a case where an attention is paid to I-knee (left knee), it is assumed that the position and the type of the joint at a time N are $(x_N, y_N, z_N)$ type0. It is assumed that the position and the type of the joint at a time N+1 are $(x_{N+1}, y_{N+1}, z_{N+1})$ type1. From this information, the movement amount and the type transition of the I-knee are as follows. Movement amount: $(\Delta x_N, \Delta x_N^2, \Delta y_N, \Delta y_N^2, \Delta z_N, \Delta z_N^2)$; and Type transition: type0→type1. Here, $\Delta x_N=(x_{N+1}-x_N)$, $\Delta y_N=(y_{N+1}-y_N)$, and $\Delta z_N=(z_{N+1}-z_N)$. In this way, the movement amount and the type transition of the joint position are defined. In the frame of the moving image to be learned, a position, a type, and a joint number of each joint of the human body are associated with each other. FIG. 17 illustrates an example of the association. In FIG. 17, x, y, z indicates a position in the image. The unit of "z" is mm, and for example, the number 3,000 indicates that the joint is present on a plane positioned three meters above away from the camera in the z axis direction. The unit of "z" is an example and depends on the depth camera to be used.

The equation of when the condition of the depth "z" is added to the conditions for specifying the position is expressed in the following equation (5).

[Equation (5)]

$$\xi(x_i, y_i, z_i, t_i, n, n-1) = w_1\Delta x_n + w_2\Delta x_n^2 + w_3\Delta y_n + w_4\Delta y_n^2 + w_5\Delta z_n + w_6\Delta z_n^2 \quad (5)$$

x: x coordinate
y: y coordinate
z: z coordinate
t: type
n: frame

The symbol ξ is expressed by the inner product of the movement amount of the same joint and the vector of the weight value "w" in the joint type transition score function. The weight value "w" ($w_1, w_2, w_3, w_4, w_5, w_6$) is determined by learning the type transition DB. In the case of considering the condition of the depth "z" as well, the total score function is expressed by the following equation (6).

[Equation (6)]

$$F(x, y, z, t, n) = \underbrace{\sum_{i \in V} \phi(x_i, y_i, z_i, t_i)}_{\text{Joint Position Probability Distribution Function}} + \underbrace{\sum_{i,j \in E} \psi(x_i, y_i, z_i, x_j, y_j, z_j, t_i, t_j)}_{\text{Joint Relative Position Score Function}} + \underbrace{\sum_{i \in V, n \in T} \xi(x_i, y_i, z_i, t_i, n, n-1)}_{\text{Joint Type Transition Score Function}} \quad (6)$$

x: x coordinate
y: y coordinate
z: z coordinate
t: type
n: frame
V: joint group
E: group of straight lines connecting joints with each other
T: frame group ($N-1, N, N+1$;
    N is a number of a frame to be subjected to pose estimation)

With respect to the total score function F having the three terms of the joint position probability distribution function ($\varphi( )$), the joint relative position score function ($\psi( )$), and the joint type transition score function ($\xi( )$) as expressed by the equation (6) above, (x, y, z, t) which maximizes the F is searched for. Here, x, y, z indicates a position of a joint, and "t" indicates a joint type. The information processing apparatus 200 may estimate the most probable joint position by searching for the position of the joint at which the score of the total score function is the highest. As a result, the information processing apparatus 200 may obtain the estimation result of the pose of the human body in consideration of the depth "z" as well. The conditions, other than the addition of the condition of the depth "z," are the same as described in the first embodiment.

Third Embodiment

In the first embodiment, the aspect of performing the pose estimation by using the score of the probability distribution, the relative position score, and the transition score has been described. Meanwhile, from the viewpoint of estimating the pose of the human body by using the transition information of a joint, the pose estimation may be performed by using the score of the probability distribution and the transition score.

A third embodiment is the same as the first embodiment, except that in the third embodiment, the pose estimation of the human body is performed from the score of the probability distribution and the transition score. Hereinafter, descriptions will be made focusing on the difference from the first embodiment.

A score function obtained by linearly combining the joint position probability distribution function ($\varphi( )$) and the joint type transition score function ($\xi( )$) is expressed by the following equation (7).

[Equation (7)]

$$F(x, y, t, n) = \underbrace{\sum_{i \in V} \phi(x_i, y_i, t_i)}_{\text{Joint Position Probability Distribution Function}} + \underbrace{\sum_{i \in V, n \in T} \xi(x_i, y_i, t_i, n, n-1)}_{\text{Joint Type Transition Score Function}} \quad (7)$$

x: x coordinate
y: y coordinate
t: type
n: frame
V: joint group
T: frame group ($N-1, N, N+1$;
    N is a number of a frame to be subjected to pose estimation)

With respect to the score function expressed by the equation (7) above, the position of the joint at which the score of the score function is the highest is searched for. As a result, the information processing apparatus 200 may estimate the most probable position of the joint in consideration of the position of the joint type in the frame and the consistency of the transition of the joint type among the frames. As a result, the information processing apparatus 200 may obtain the estimation result of the pose of the human body. The conditions, other than obtaining the position of the joint by using the score of the probability distribution and the transition score, are the same as described in the first embodiment.

Fourth Embodiment

In the first embodiment, the aspect of performing the pose estimation by using the joint type has been described. Meanwhile, when calculating the relative position score, the consistency of the relative position relationship between a joint and an adjacent joint thereof may be evaluated without using the joint type. In addition, when calculating the transition score, the consistency of the transition of the same joint among different frames may be evaluated without using the joint type. The fourth embodiment is the same as the first embodiment, except that in the fourth embodiment, the pose estimation of the human body is performed without using the joint type. Hereinafter, descriptions will be made focusing on the difference from the first embodiment.

In the fourth embodiment, the joint position estimation model 300, the joint type relative position model 310, and the joint type transition model 320 which are used in the first embodiment are changed into the following models. In the fourth embodiment, a joint position estimation model 300a, a joint relative position model 310a, and a joint transition model 320a which are obtained through a learning are used without using the joint type. By using these models, the total score function having the three terms of the obtained joint position probability distribution function ($\varphi( )$), joint relative position score function ($\psi( )$), and joint transition score function ($\xi( )$) is expressed by the following equation (8).

[Equation 8]

$$F(x, y, ta, n) = \underbrace{\sum_{i \in V} \phi(x_i, y_i, ta_i)}_{\text{Joint Position Probability Distribution Function}} + \qquad (8)$$

$$\underbrace{\sum_{i,j \in E} \psi(x_i, y_i, ta_i, x_j, y_j, ta_j)}_{\text{Joint Relative Position Score Function}} + \underbrace{\sum_{i \in V, n \in T} \xi(x_i, y_i, ta_i, n, n-1)}_{\text{Joint Transition Score Function}}$$

x: x coordinate
y: y coordinate
ta: joint
n: frame
V: joint group
E: group of straight lines connecting joints with each other
T: frame group (N − 1, N, N + 1;
    N is a number of a frame to be subjected to pose estimation)

With respect to the total score function expressed by the equation (8) above, the position of the joint at which the score of the score function is the highest is searched for. For example, (x, y, ta, n) which maximizes the score function F of the equation (8) above is searched for. Here, x, y indicate a position of a joint, "ta" indicates a joint, and "n" indicates a frame. Further, in the function of the equation (8) above, the "ta" (joint) corresponds to a case where the number of the joint types is one in the function of the equation (4) above. Thus, the information processing apparatus 200 may estimate the most probable position of the joint in consideration of the position of the joint in the frame and the consistency of the transition of the joint among the frames. As a result, the information processing apparatus 200 obtains the estimation result of the pose of the human body. The conditions, other than estimating the joint position without using the joint type, are the same as described in the first embodiment.

Fifth Embodiment

Unlike the first embodiment, when calculating the transition score, the pose estimation may be performed by using an image to be subjected to the pose estimation and images of two or more frames selected from at least one image of the preceding and succeeding frames of the image to be subjected to the pose estimation. The fifth embodiment is the same as the first embodiment, except that in the fifth embodiment, the pose of the human body is estimated by calculating the transition score by not only using a preceding or succeeding frame but also using images of N (N=2, 3, 4, . . . ) preceding and succeeding frames. Hereinafter, descriptions will be made focusing on the difference from the first embodiment.

The total score function obtained by linearly combining the joint position probability distribution function (ψ( )), the joint relative position score function (ψ( )), and the joint type transition score function (ξ( )) is expressed by, for example, the following equation (9).

[Equation (9)]

$$F(x, y, t, n) = \underbrace{\sum_{i \in V} \phi(x_i, y_i, t_i)}_{\text{Joint Position Probability Distribution Function}} + \underbrace{\sum_{i,j \in E} \psi(x_i, y_i, t_i, x_j, y_j, t_j)}_{\text{Joint Relative Position Score Function}} + \qquad (9)$$

$$\underbrace{\sum_{i \in V, n \in T} \xi(x_i, y_i, t_i, n, n-1)}_{\substack{\text{Joint Type Transition Score Function} \\ \text{(one-frame preceding)}}} + \underbrace{\sum_{i \in V, n \in T} \xi(x_i, y_i, t_i, n+1, n)}_{\substack{\text{Joint Type Transition Score Function} \\ \text{(one-frame succeeding)}}} +$$

$$\underbrace{\sum_{i \in V, n \in T'} \xi(x_i, y_i, t_i, n, n-2)}_{\substack{\text{Joint Type Transition Score Function} \\ \text{(two-frame preceding)}}} + \underbrace{\sum_{i \in V, n \in T'} \xi(x_i, y_i, t_i, n+2, n)}_{\substack{\text{Joint Type Transition Score Function} \\ \text{(two-frame succeeding)}}}$$

With respect to the total score function expressed by the equation (9) above, the position of the joint at which the score of the score function is the highest is searched for. For example, (x, y, t, n) that maximizes the score function F of the equation (0) is searched for. In the first embodiment, ξ calculates the transition score based on a target frame and a preceding frame of the target frame. However, as expressed in the equation (9) above, the transition score may be calculated by using a subsequent frame of a target frame, a frame two frames earlier than the target frame, and a frame two frames later than the target frame. The conditions, other than changing the number of frames to be used for calculating the transition score, are the same as described in the first embodiment.

Sixth Embodiment

Unlike the first embodiment, when calculating the transition score, the using an image to be subjected to the pose estimation and images of one or more frames selected from at least one of preceding and succeeding frames of the image to be subjected to the pose estimation may be implemented in the following aspect. When the total score function is obtained by linearly combining joint type transition score functions in the respective frames, weight value coefficients set for the respective frames may be multiplied. As a result, the influence of the joint type transition score functions of the preceding and succeeding frames on the total score function may be adjusted. The sixth embodiment is the same as the first embodiment, except for in the sixth embodiment, the total score function is obtained by multiplying the joint type transition score functions in the preceding and succeeding frames by the weight value coefficients, and the transition score is calculated by using the total score function.

Hereinafter, descriptions will be made focusing on the difference from the first embodiment.

The total score function obtained by linearly combining the joint position probability distribution function (φ( )), the joint relative position score function (ψ( )), and the joint type transition score function (ξ( )) is expressed by, for example, the following equation (10).

[Equation (10)]

$$F(x, y, t, n) = \underbrace{\sum_{i \in V} \phi(x_i, y_i, t_i)}_{\text{Joint Position Probability Distribution Function}} + \underbrace{\sum_{i,j \in E} \psi(x_i, y_i, t_i, x_j, y_j, t_j)}_{\text{Joint Relative Position Score Function}} +$$

$$\alpha \underbrace{\sum_{i \in V, n \in T} \xi(x_i, y_i, t_i, n, n-1)}_{\text{Joint Type Transition Score Function (one-frame preceding)}} + \beta \underbrace{\sum_{i \in V, n \in T} \xi(x_i, y_i, t_i, n+1, n)}_{\text{Joint Type Transition Score Function (one-frame succeeding)}} +$$

$$\gamma \underbrace{\sum_{i \in V, n \in T'} \xi(x_i, y_i, t_i, n, n-2)}_{\text{Joint Type Transition Score Function (two-frame preceding)}} + \delta \underbrace{\sum_{i \in V, n \in T'} \xi(x_i, y_i, t_i, n, n+2, n)}_{\text{Joint Type Transition Score Function (two-frame succeeding)}}$$

(10)

As expressed in the equation (10) above, the joint type transition score functions may be multiplied by hyper parameters α, β, γ, and δ. For example, when importance is given to scores with preceding and succeeding frames, the parameters may be set to α=1, β=1, γ=0.5, and δ=0.5. In addition, when importance is also given to scores with a two-frame preceding frame or a two-frame succeeding frame, the parameters may be set to α=0.5, β=0.5, γ=0.5, and δ=0.5. The conditions, other than multiplying the joint type transition score functions of the preceding and succeeding frames to be used by the coefficients when calculating the transition score, are the same as described in the first embodiment.

Seventh Embodiment

Figure 18:
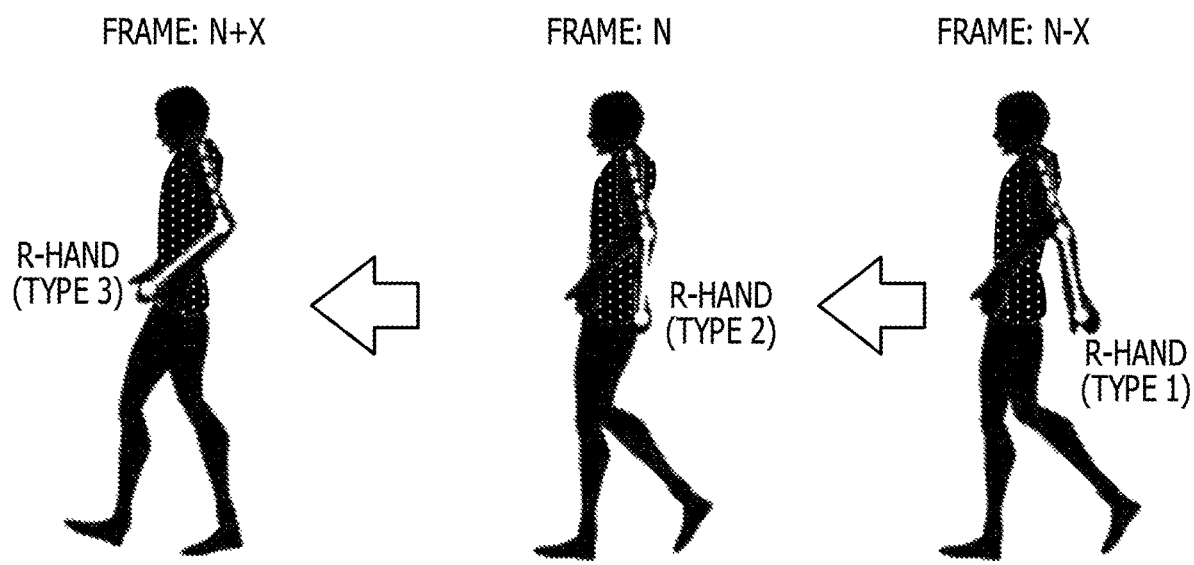
FIG. 18 is a view illustrating an example of a result of an occlusion evaluation using an information processing method.

By using the information processing apparatus of the first embodiment, the position of a hidden joint even in an occlusion as illustrated in FIG. 18 may be estimated with the high precision, so that the pose of the human body may be estimated. The occlusion indicates an occurrence of a state where a front object hides a rear object so that the rear object is not seen. As illustrated in FIG. 18, by using the joint type transition score function that has learned the type transition of the r-hand, the position of the hidden joint may be estimated with the high precision even though the occlusion occurs.

As described above, the information processing apparatus may estimate the posture of the object having a plurality of joints with high precision, by performing the position estimation of the joints in consideration of the relationship with the preceding and succeeding frames as well. Since the information processing apparatus is capable of estimating the posture of the human body with high precision, the information processing apparatus may be used as a scoring assistant means at the time of scoring a competition such as gymnastics or dancing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program for causing a computer to execute a process comprising:
    calculating, by using an image including an object having a plurality of joints and having a plurality of frames consecutive in time, a probability distribution of a joint position of the object in each frame as a probability distribution function;
    calculating, as a relative position score function, a relative position score by evaluating a consistency of a relative position relationship among the joints of the object in each frame;
    calculating, as a transition score function, a transition score by evaluating a consistency of a transition of a joint of the plurality of joints using transition information of the joint among different frames; and
    estimating a pose of the object by linearly combining the probability distribution function, the relative position score function, and the transition score function.

2. The non-transitory computer-readable recording medium according to claim 1, wherein when calculating the transition score, a consistency of a transition of a joint type is evaluated by using the joint type including the joint and a part coupled to the joint.

3. The non-transitory computer-readable recording medium according to claim 1, wherein the pose of the object is estimated by obtaining a total score function by linearly combining the probability distribution function, the relative position score function and the transition score function and searching for a maximum value of the total score function.

4. The non-transitory computer-readable recording medium according to claim 1, wherein when calculating the relative position score, a consistency among joint types is evaluated by using the joint type including a joint and a part coupled to the joint.

5. The non-transitory computer-readable recording medium according to claim 1, wherein when estimating the pose of the object by using the transition score, the pose of the object is estimated by using an image to be subjected to a pose estimation and images of two or more frames selected from at least one image of preceding and succeeding frames of the image to be subjected to the pose estimation.

6. The non-transitory computer-readable recording medium according to claim 1, wherein when estimating the pose of the object by using the transition score, and in a case of using an image to be subjected to a pose estimation and an image of one or more frames selected from at least one image of preceding and succeeding frames of the image to be subjected to the pose estimation, the pose of the object is estimated by calculating a score by multiplying a weight value coefficient set for each frame.

7. An information processing apparatus comprising:
    a memory; and
    a processor coupled to the memory and configured to:
        calculate a probability distribution of a joint position of an object in each frame by using an image including the object having a plurality of joints and having a plurality of frames consecutive in time as a probability distribution function;
        calculate, as a relative position score function, a relative position score by evaluating a consistency of a relative position relationship among the joints of the object in each frame;
        calculate, as a transition score function, a transition score by evaluating a consistency of a transition of a joint of the plurality of joints using transition information of the joint among different frames; and estimate a pose of the object by linearly combining the probability distribution function, the relative position score function, and the transition score function.

8. An information processing method comprising:

calculating, by using an image including an object having a plurality of joints and having a plurality of frames consecutive in time, a probability distribution of a joint position of the object in each frame as a probability distribution function;

calculating, as a relative position score function, a relative position score by evaluating a consistency of a relative position relationship among the joints of the object in each frame;

calculating, as a transition score function, a transition score by evaluating a consistency of a transition of a joint of the plurality of joints using transition information of the joint among different frames; and estimating a pose of the object by linearly combining the probability distribution function, the relative position score function, and the transition score function.

9. An information processing system comprising:

an information processing apparatus including:
  a memory; and
  a processor coupled to the memory and configured to:
    calculate a probability distribution of a joint position of an object in each frame by using an image including the object having a plurality of joints and having a plurality of frames consecutive in time as a probability distribution function;
    calculate, as a relative position score function, a relative position score by evaluating a consistency of a relative position relationship among the joints of the object in each frame;
    calculate, as a transition score function, a transition score by evaluating a consistency of a transition of a joint of the plurality of joints using transition information of the joint of the object among different frames; and
    estimate a pose of the object by linearly combining the probability distribution function, the relative position score function, and the transition score function; and a learning apparatus that causes a controller to learn the transition information of the same joint of the object which is used in the transition score calculation unit of the information processing apparatus for evaluating the consistency of the transition of the joint, and outputs the learned transition information of the same joint of the object to the information processing apparatus.

* * * * *